(12) United States Patent
Misaki

(10) Patent No.: US 9,632,635 B2
(45) Date of Patent: Apr. 25, 2017

(54) TOUCH PANEL AND TOUCH PANEL-EQUIPPED DISPLAY DEVICE

(71) Applicant: Sharp Kabushiki Kaisha, Osaka-shi, Osaka (JP)

(72) Inventor: Katsunori Misaki, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 233 days.

(21) Appl. No.: 14/408,366

(22) PCT Filed: Jun. 28, 2013

(86) PCT No.: PCT/JP2013/067796
§ 371 (c)(1),
(2) Date: Dec. 16, 2014

(87) PCT Pub. No.: WO2014/007157
PCT Pub. Date: Jan. 9, 2014

(65) Prior Publication Data
US 2015/0169107 A1  Jun. 18, 2015

(30) Foreign Application Priority Data
Jul. 2, 2012 (JP) ................................. 2012-148190

(51) Int. Cl.
*B32B 3/02* (2006.01)
*G06F 3/044* (2006.01)
(Continued)

(52) U.S. Cl.
CPC .......... *G06F 3/044* (2013.01); *G02F 1/13338* (2013.01); *G06F 3/0412* (2013.01);
(Continued)

(58) Field of Classification Search
CPC .... G06F 1/13338; G06F 3/044; G06F 3/0412; G06F 2203/04107; G06F 2203/04112
See application file for complete search history.

(56) References Cited

U.S. PATENT DOCUMENTS

2014/0216924 A1* 8/2014 Lotz ..................... H01J 37/3429
204/192.23
2014/0232951 A1* 8/2014 Ueda ....................... C23C 14/08
349/12

(Continued)

FOREIGN PATENT DOCUMENTS

JP 2002-090712 A 3/2002
JP 2011-013725 A 1/2011

*Primary Examiner* — Elizabeth Mulvaney
(74) *Attorney, Agent, or Firm* — Keating & Bennett, LLP

(57) ABSTRACT

An arrangement of a touch panel is provided that prevents corrosion of the lines and improves reliability. A touch panel includes: a substrate (10); a sensor electrode located on the substrate (10) and formed of an oxide conductive film; a line (161) electrically connected with the sensor electrode; and a protection film (14) provided over the line (161). The protection film (14) includes: a first protection sub-film (141) formed of silicon nitride; a second protection sub-film (142) located on the first protection sub-film (141), formed of silicon nitride and having a lower refractive index than the first protection sub-film (141); and a third protection sub-film (143) located on the second protection sub-film (142), formed of silicon nitride and having a higher refractive index than the second protection sub-film (142), wherein the second protection sub-film (142) has a thickness that is no smaller than the total thickness of the first protection sub-film (141) and the third protection sub-film (143).

8 Claims, 28 Drawing Sheets

(51) Int. Cl.
*G06F 3/041* (2006.01)
*G02F 1/1333* (2006.01)
(52) U.S. Cl.
CPC .............. *G06F 2203/04107* (2013.01); *G06F 2203/04111* (2013.01)

(56) References Cited

U.S. PATENT DOCUMENTS

| | | | |
|---|---|---|---|
| 2015/0062710 A1* | 3/2015 | Grillmayer | H01J 37/3405 359/585 |
| 2015/0083464 A1* | 3/2015 | Zilbauer | G06F 3/041 174/251 |

* cited by examiner

Fig.20C
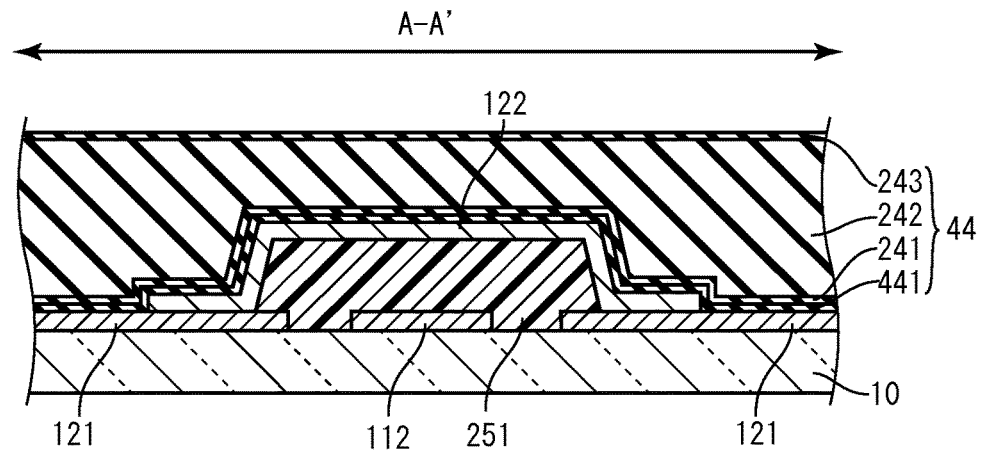
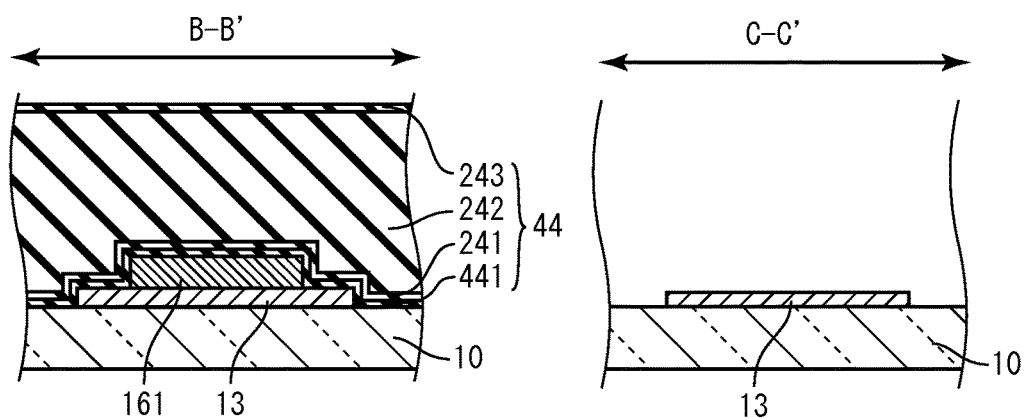
Fig.21
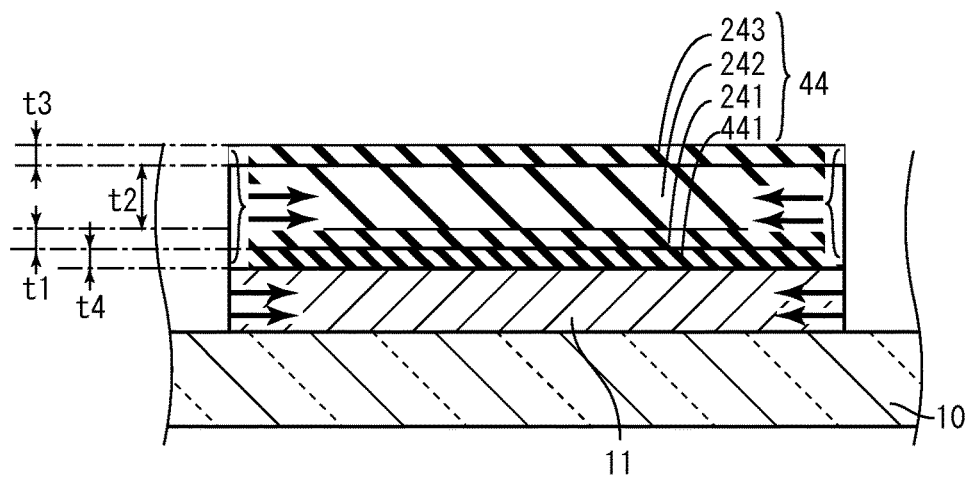

TOUCH PANEL AND TOUCH PANEL-EQUIPPED DISPLAY DEVICE

TECHNICAL FIELD

The present invention relates to a touch panel and a touch panel-equipped display device, and more particularly to a capacitive touch panel and touch panel-equipped display device.

BACKGROUND ART

A touch panel is placed over a display device. In view of this, electrode films (sensor electrodes) formed in the display region are transparent oxide conductive films, such as ones of indium tin oxide (ITO) or indium zinc oxide (IZO).

On the other hand, in the picture-frame region, which is outside the display region, metal films with low electric resistance may be used as lines. One problem with metal films is that they may be corroded by impurities, such as water. Thus, impurities such as water may permeate through the surface of the touch panel and corrode the metal films. Such corrosion may reduce the reliability of the lines in the long run.

JP 2011-13725 A describes a capacitive touch panel. This touch panel includes a line protection film provided over the routed lines and a planarizing film provided over the electrodes and routed lines. According to the above document, the line protection film and planarizing film are formed by a printing method using materials such as polysiloxane or an acrylic resin or acrylic monomer. According to the above document, if line protection film and planarizing film are formed using polysiloxane, they will be inorganic insulating films made of silicon oxide; if they are formed using an acrylic resin or acrylic monomer, they will be organic insulating films made of a resin material.

DISCLOSURE OF THE INVENTION

In the above arrangement, both the line protection film and planarizing film are made of silicon oxide or a resin. A problem is with silicon oxide and a resin is that both of them have poor moisture resistances and insufficient barrier performances. As such, the lines of the above arrangement are not reliable.

A film for protecting lines may preferably be made of silicon nitride, which provides high barrier performance. A problem with a silicon nitride film is that it has poor adhesion to an oxide conductive film and thus, when formed on an oxide conductive film, it can easily peel off.

An object of the present invention is to provide an arrangement of a touch panel that prevents corrosion of the lines and improves reliability.

A touch panel disclosed herein includes: a substrate; a sensor electrode located on the substrate and formed of an oxide conductive film; a line electrically connected with the sensor electrode; and a protection film provided over the line. The protection film includes: a first protection sub-film formed of silicon nitride; a second protection sub-film located on the first protection sub-film, formed of silicon nitride and having a lower refractive index than the first protection sub-film; and a third protection sub-film located on the second protection sub-film, formed of silicon nitride and having a higher refractive index than the second protection sub-film, wherein the second protection sub-film has a thickness that is no smaller than the total thickness of the first and third protection sub-films.

The present invention provides an arrangement of a touch panel that prevents corrosion of the lines and improves reliability.

BRIEF DESCRIPTION OF THE DRAWINGS

FIG. 20C shows cross-sections illustrating the method of manufacturing the touch panel according to the fourth embodiment of the present invention.

FIG. 21 schematically illustrates film stress in the oxide conductive film and the protection film on the oxide conductive film of the fourth embodiment of the present invention.

EMBODIMENTS FOR CARRYING OUT THE INVENTION

Figure 1:
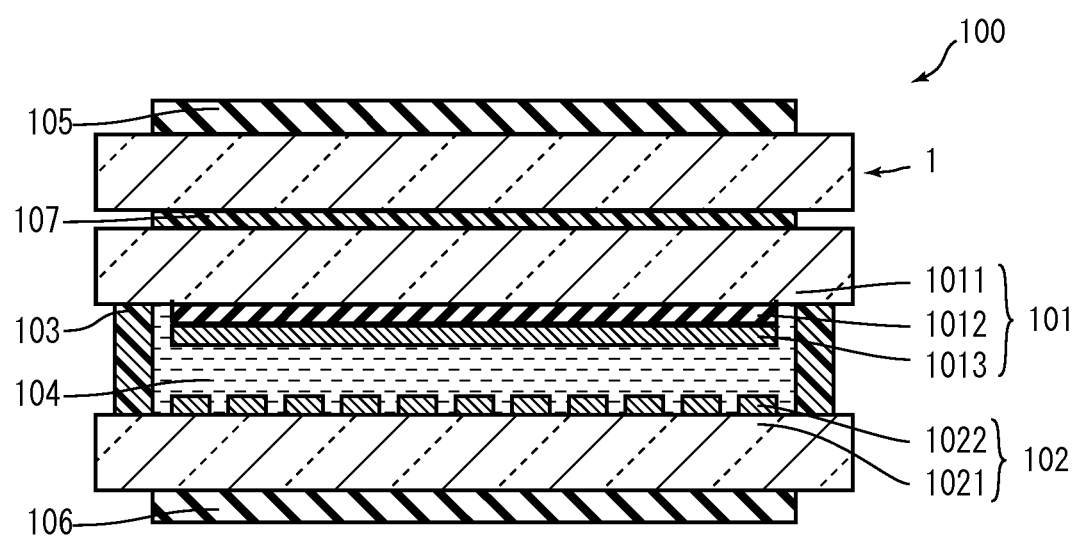
FIG. 1 is a schematic cross-sectional view of a touch panel-equipped display device according to an embodiment of the present invention.

A touch panel according to an embodiment of the present invention includes: a substrate; a sensor electrode located on the substrate and formed of an oxide conductive film; a line electrically connected with the sensor electrode; and a protection film provided over the line. The protection film includes: a first protection sub-film formed of silicon nitride; a second protection sub-film located on the first protection sub-film, formed of silicon nitride and having a lower refractive index than the first protection sub-film; and a third protection sub-film located on the second protection sub-film, formed of silicon nitride and having a higher refractive index than the second protection sub-film, wherein the second protection sub-film has a thickness that is no smaller than the total thickness of the first and third protection sub-films (first arrangement).

In the above arrangement, the protection film covering the lines is formed of a silicon nitride film. A silicon nitride film has a low moisture permeability and thus a high barrier performance. This provides an arrangement that prevents the lines from corroding and thus has improved reliability.

The higher the refractive index of a silicon nitride film, the greater the tendency of the film to have compressive film stress. The film stress in an oxide conductive film is typically tensile. As such, if a silicon nitride film with a high refractive index is provided on an oxide conductive film, the silicon nitride film can easily peel off due to the difference in film stress. On the other hand, a silicon nitride film with a low refractive index has a high reactivity. As such, if an oxide conductive film is in contact with a silicon nitride film with a low refractive index, oxidation-reduction may occur, causing these films to deteriorate. Further, if a silicon nitride film with a low refractive index is exposed to the atmosphere, the silicon nitride film may deteriorate. More specifically, the silicon nitride film may become a silicon oxynitride film, which has decreased barrier performance, while the oxide conductive film may be metallized, resulting in decreased optical transmittance.

In the above arrangement, the protection film includes a first protection sub-film, a second protection sub-film that has a lower refractive index than the first protection sub-film, and a third protection sub-film that has a higher refractive index than the second protection sub-film. That is, the second protection sub-film, which has a relatively low refractive index, is sandwiched between the first and third protection sub-films, which have relatively high refractive indices. As such, the second protection sub-film, which has a relatively high reactivity, is not exposed. Further, as the thickness of the second protection sub-film is not smaller than the total thickness of the first and third protection sub-films, the film stress in the protection film taken as a whole is adjusted to be rather tensile. Thus, good adhesiveness may be provided even if a protection film is provided in contact with an oxide conductive film.

Starting from the first arrangement, it is preferable that the protection film is in contact with the sensor electrodes (second arrangement).

The above arrangement eliminates the necessity to form an intermediate layer between the sensor electrodes and the protection film before forming the protection film or to remove the portions of the protection film that are in contact with the sensor electrodes by patterning. This simplifies the manufacturing process.

Starting from the first or second arrangement, the refractive index of the first protection sub-film may be no lower than 1.805, the refractive index of the second protection sub-film may be lower than 1.805, and the refractive index of the third protection sub-film may be no lower than 1.805 (third arrangement).

Starting from one of the first to third arrangements, it is preferable that the film stress in the second protection sub-film is tensile, and the film stress in the protection film taken as a whole is tensile (fourth arrangement).

The film stress in an oxide conductive film is typically tensile. In the above arrangement, the film stress in the protection film as a whole is tensile. As the protection film and oxide conductive film have the same type of film stress, the adhesion of the protection film to the oxide conductive film is further improved.

Starting from any one of the first to fourth arrangements, it is preferable that the thickness of the first protection sub-film is no greater than 100 nm, and the thickness of the third protection sub-film is no greater than 100 nm (fifth arrangement).

The thickness of the second protection sub-film is not smaller than the total thickness of the first and third protection sub-films. To minimize the total thickness of the film, the smaller the thickness of each of the first and third protection sub-films, the better it is. More specifically, the thickness of the first protection sub-film is preferably no greater than 100 nm and the thickness of the second protection sub-film is preferably no greater than 100 nm, as in the above arrangement.

Starting from any one of the first to fifth arrangements, it is preferable that the protection film further includes a fourth protection sub-film formed of silicon oxide, the first protection sub-film is located on the fourth protection sub-film, and the thickness of the second protection sub-film is no smaller than the total thickness of the first, third and fourth protection sub-films (sixth arrangement).

In the above arrangement, the protection film further includes a fourth protection sub-film formed of silicon oxide, which has good adhesion to the oxide conductive film. This further improves the adhesion of the protection film to the oxide conductive film.

Starting from any one of the first to sixth arrangements, the sensor electrodes may include: a first electrode extending in one direction; and a second electrode extending in a direction that crosses the direction in which the first electrode extends, the second electrode may include: a plurality of insular electrodes; and connecting portions connecting the insular electrodes, and the protection film may be located in a layer between the first electrode and the connecting portions (seventh arrangement).

Starting from any one of the first to sixth arrangements, the protection film may be located in a layer that is more distant from the substrate than the sensor electrodes are (eight arrangement).

A touch panel-equipped display device according to an embodiment of the present invention includes: a liquid crystal display device; and the touch panel of any one of the first to eighth arrangements (first arrangement of a touch panel-equipped display device).

[Embodiments]

Now, embodiments of the present invention will be described in detail with reference to the drawings. The same or corresponding elements in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

[Overall Construction]

FIG. 1 is a schematic cross-sectional view of a touch panel-equipped display device 100 according to an embodiment of the present invention. The touch panel-equipped display device 100 includes a touch panel 1, a color filter substrate 101, thin-film transistor (TFT) substrate 102, a seal material 103, liquid crystal 104, polarizers 105 and 106 and a pasting material 107.

A side of the color filter substrate 101 faces a side of the TFT substrate 102. The seal material 103 is provided on the peripheral portions of the color filter substrate 101 and TFT substrate 102, and the liquid crystal 104 is enclosed within. The touch panel 1 is attached, via the pasting material 107, to the side of the color filter substrate 101 that is opposite the side thereof adjacent the liquid crystal 104. The polarizer 105 is located on the side of the touch panel 1 that is opposite the side thereof adjacent the color filter substrate 101. The polarizer 106 is located on the side of the TFT substrate 102 that is opposite the side thereof adjacent the liquid crystal 104.

As described in detail below, the touch panel 1 includes a substrate and sensor electrodes. The sensor electrodes are capable of creating a capacitance between themselves and a finger or the like that is positioned close to the touch panel 1. Based on changes in the capacitance, the touch panel 1 is capable of detecting the location of the finger or the like.

The color filter substrate 101 includes an insulating substrate 1011, color filters 1012 and a common electrode 1013. The common electrode 1013 is uniformly shaped and present generally on the entire display region of the substrate 1011.

The TFT substrate 102 includes an insulating substrate 1021, a pixel electrodes 1022 and TFTs, not shown. The pixel electrodes 1022 and TFTs are located on the substrate 1021 and arranged in a matrix. The TFTs may be ones that contain amorphous silicon or indium zinc gallium oxide (IZGO); preferably, the TFTs may be ones that contain IZGO, which permits greater electron movement.

The touch panel-equipped display device 100 may drive the TFTs on the TFT substrate 102 to create an electric field between a pixel electrode 1022 and the common electrode 1013 in order to control the orientation of the liquid crystal 104. The liquid crystal display device 100 uses the orientation of the liquid crystal 104 and the polarizers 105 and 106 to control each pixel to be light transmitting or non-transmitting. This causes an image to be displayed on the touch panel-equipped display device 100.

The touch panel-equipped display device 100 has been schematically described. In the touch panel-equipped display device 100, the polarizer 105 is located on the outer side of the touch panel 1 (i.e. the side that is opposite the side adjacent the color filter substrate 101). Alternatively, in the touch panel-equipped display device 100, the polarizer 105 may be located on the side of the color filter substrate 101 that is opposite the side thereof adjacent the liquid crystal 104 and the touch panel 1 may be attached to this polarizer.

[Construction of Touch Panel]

[First Embodiment]

Figure 2:
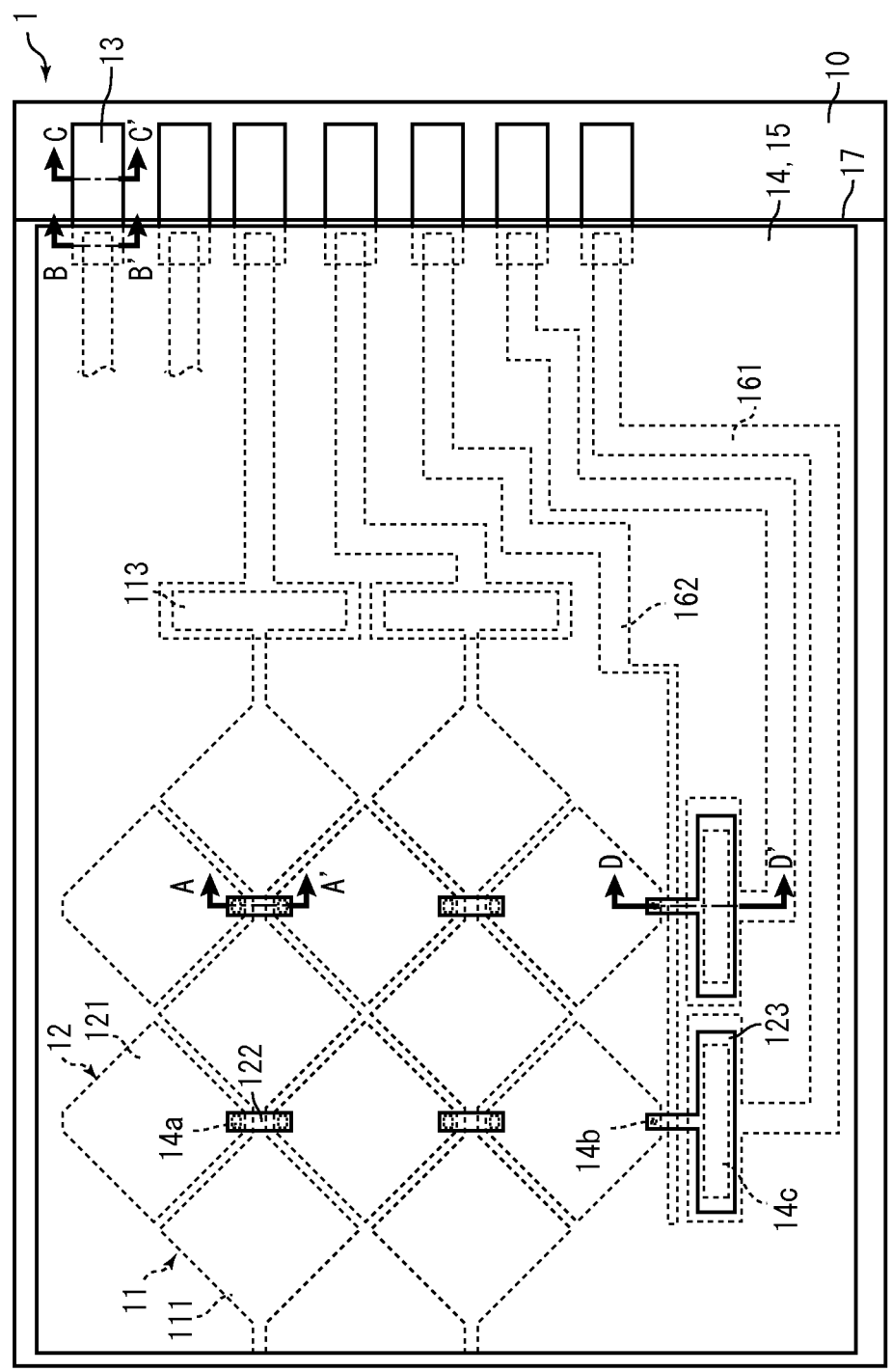
FIG. 2 is a schematic plan view of a touch panel according to a first embodiment of the present invention.
Figure 3:
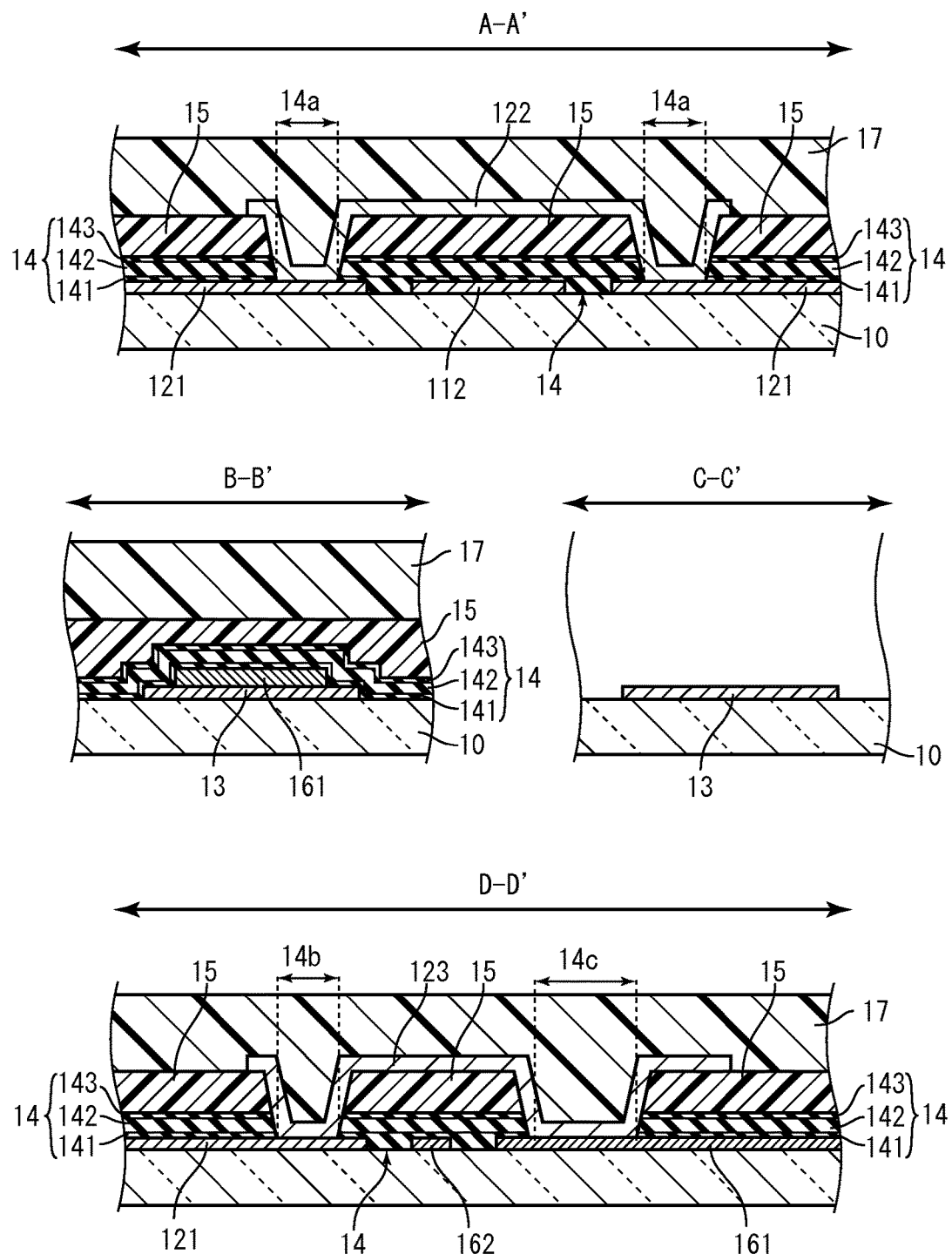
FIG. 3 shows cross-sections taken along lines A-A', B-B', C-C' and D-D' of FIG. 2.

The construction of the touch panel 1 will be described in detail below. FIG. 2 is a schematic plan view of a touch panel 1 according to a first embodiment of the present invention. FIG. 3 shows cross-sections taken along lines A-A', B-B', C-C' and D-D' of FIG. 2. The touch panel 1 includes a substrate 10, X electrodes 11, Y electrodes 12, terminals 13, a protection film 14, an insulating film 15, lines 161, a ground line 162, and an overcoat film 17.

The substrate 10 may be, for example, a glass substrate or a transparent resin film. A surface of the substrate 10 may be coated with a passivation film or the like. The X electrodes 11, Y electrodes 12, terminals 13, protection film 14, insulating film 15, lines 161, ground line 162, and overcoat film 17 are located on one of the sides of the substrate 10.

Figure 4:
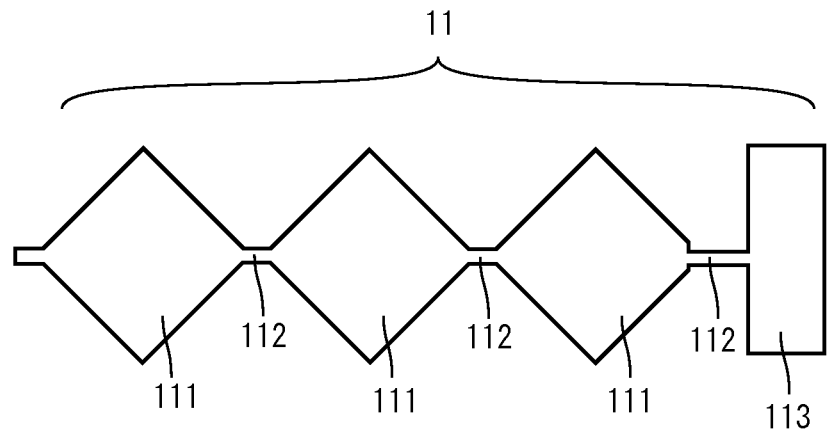
FIG. 4 is a plan view of one of the X electrodes.

FIG. 4 is a plan view of one of the X electrodes 11. The X electrode 11 includes a plurality of insular electrodes 111 arranged along one direction and connecting portions 112, each connecting portion connecting two adjacent insular electrodes 111. The X electrode 11 further includes a connecting portion 113 located at one end of its extension for providing connection to a line 161. The insular electrodes 111 and connecting portions 112 and 113 are integrally formed.

Figure 5:
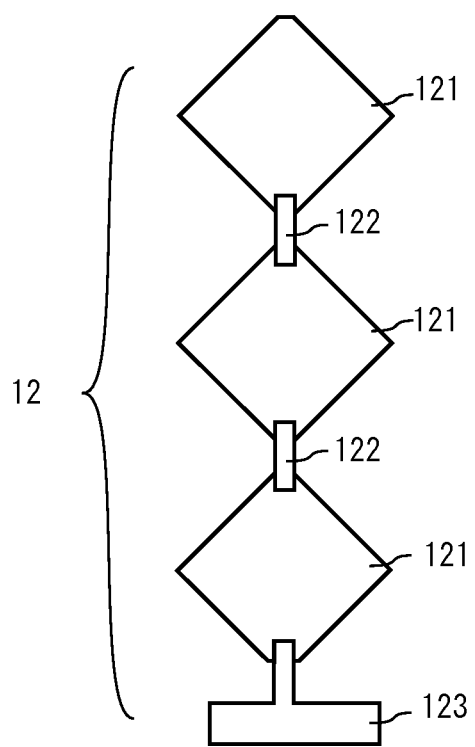
FIG. 5 is a plan view of one of the Y electrodes.

FIG. 5 is a plan view of one of the Y electrodes 12. The Y electrode 12 includes a plurality of insular electrodes 121 arranged along a direction that crosses the X electrodes 11, and connecting portions 122, each connecting portion connecting two adjacent insular electrodes 121. The Y electrode 12 further includes a connecting portion 123 located at one end of its extension for providing connection to a line 161. As described below, the insular electrodes 121 and the connecting portions 122 and 123 are formed in different steps.

The X and Y electrodes 11 and 12 are formed from an oxide conductive film that is transparent and electrically conductive. The X and Y electrodes 11 and 12 may be made of ITO or IZO, for example.

Returning to FIGS. 2 and 3, the connecting portions 122 of the Y electrodes 12 are located in a layer different from that of the X electrodes 11 and the insular electrodes 121 of the Y electrodes 12, separated by the protection film 14 and insulating film 15. In the Y electrodes 12, a connecting portion 122 is in contact with the associated insular electrodes 121 via contact holes 14a that extend through the protection film 14 and insulating film 15. This construction allows an X electrode 11 and a Y electrode 12 to cross each other without being electrically connected.

The connecting portions 123 of the Y electrodes 12 are located in a layer different from that of X electrodes 11 and the insular electrodes 121 of the Y electrodes 12. In the Y electrodes 12, a connecting portion 123 is in contact with the associated insular electrode 121 via a contact hole 14b that extends through the protection film 14 and insulating film 15. Further, the connecting portions 123 are located in a layer different from that of the lines 161 and ground line 162. A connecting portion 123 is in contact with the associated line 161 via a contact hole 14c that extends through the protection film 14 and insulating film 15. This construction allows a Y electrode 12 and the ground line 162 to cross each other without being electrically connected.

Terminals 13 are provided near the periphery of the substrate 10. The terminals 13 may be connected to a drive circuit, not shown, via a flexible printed circuit (FPC), for example. To facilitate this, the terminals 13 are not covered with the protection film 14, insulating film 15 or overcoat film 17. Thus, the terminals 13 are preferably formed of a material with a high corrosion resistance. The terminals 13 may be made of ITO or IZO, for example.

Each line 161 electrically connects an X electrode 11 to a terminal 13, or a Y electrode 12 to a terminal 13. More specifically, a line 161 connecting an X electrode 11 to a terminal 13 is in contact with the terminal 13 and the connecting portion 113 of the X electrode 11. A line 161 connecting a Y electrode 12 to a terminal 13 is in contact with the terminal 13 and the connecting portion 123 of the Y electrode 12. As discussed above, the line 161 is connected with the connecting portion 123 via a contact hole 14c. The ground line 162 is connected with a terminal 13 only, and is not connected with an X electrode 11 or Y electrode 12. The ground line 162 serves as a shield line for blocking electromagnetic noise. The lines 161 and ground line 162 may be made of metal films, for example.

Over a portion of each of the terminals 13, the insular electrodes 121 of the X and Y electrodes 11 and 12 and the lines 161 and ground line 162 are provided the protection film 14 and the insulating film 15, deposited in this order starting from the substrate 10. The protection film 14 and insulating film 15 overlie each other in a plan view. The protection film 14 is formed of silicon nitride. The insulating film 15 is formed of a photoresist containing an acrylic resin or novolak resin, for example.

The protection film 14 of the present embodiment has a triple-layer construction having a first protection sub-film 141, a second protection sub-film 142 and a third protection sub-film 143, deposited in this order from the substrate 10. The second protection sub-film 142 has a lower refractive index than the first protection sub-film 141, while the third protection sub-film 143 has a higher refractive index than the second protection sub-film 142. In other words, the second protection sub-film 142 has a lower refractive index than the first and third protection sub-films 141 and 143. For example, the first and third protection sub-films 141 and 143 have a refractive index not lower than 1.805, while the second protection sub-film 142 has a refractive index lower than 1.805.

The thickness of the second protection sub-film 142 is not smaller than the total thickness of the first and third protection sub-films 141 and 143. The smaller the thickness of the first and third protection sub-films 141 and 143, the better it is; preferably, the thickness of each of them is no greater than 100 nm.

The overcoat film 17 is provided generally over the entire surface of the substrate 10. However, as discussed above, a portion of each of the terminals 13 is not covered with the overcoat film 17 and is exposed. The overcoat film 17 is formed of a transparent insulating material. The overcoat film 17 may be made of an organic or inorganic material.

[Method of Manufacturing Touch Panel 1]

A method of manufacturing a touch panel 1 will be described below with reference to FIGS. 6A to 6E. FIGS. 6A to 6E show cross-sections taken along lines A-A', B-B' and C-C' of FIG. 2.

Figure 6A:
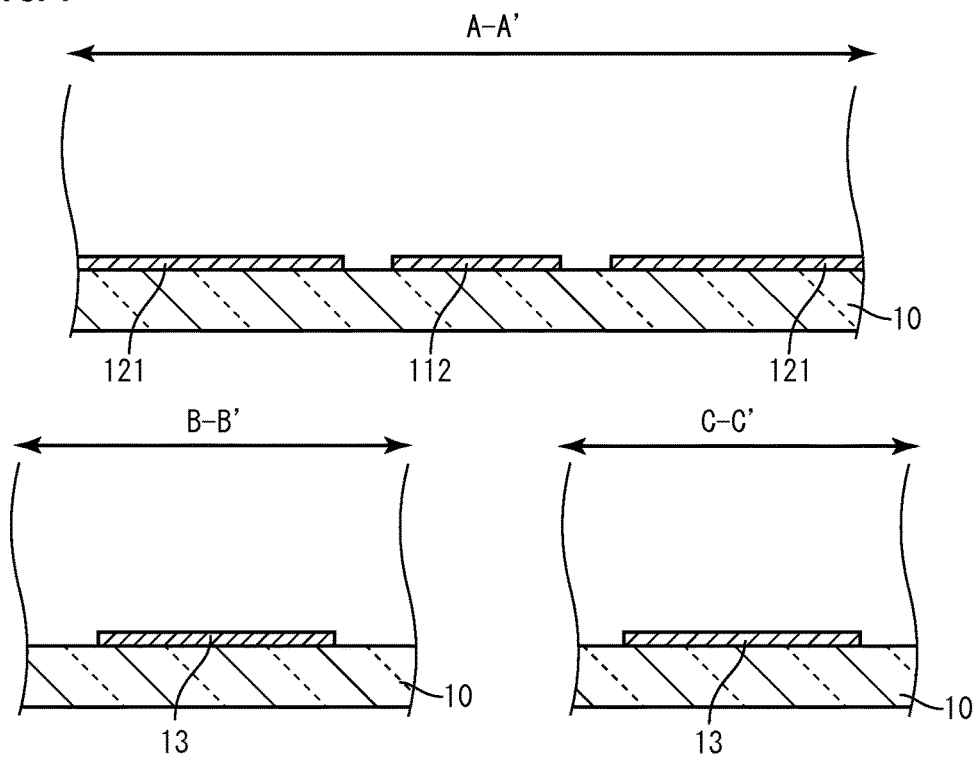
FIG. 6A shows cross-sections illustrating a method of manufacturing the touch panel according to the first embodiment of the present invention.

First, as shown in FIG. 6A, on a substrate 10 are formed connecting portions 112 for X electrodes 11, insular electrodes 121 for Y electrodes 12, and terminals 13. Although not shown in FIG. 6A, insular electrodes 111 and connecting portions 113 for the X electrodes 11 are also formed in this step. First, a uniform oxide conductive film is formed by sputtering or chemical vapor deposition (CVD). The oxide conductive film may be made of ITO or IZO, for example. The thickness of the oxide conductive film may be in the range of 10 to 50 nm, for example. The oxide conductive film that has been formed is photolithographically patterned. More specifically, a mask made of photoresist is formed in the regions where insular electrodes 111 and 121, connecting portions 112 and 113 and terminals 13 are to be formed. Then, the uncovered portions are etched away. The etching may be performed using a mixture of phosphoric acid, acetic acid and nitric acid, or oxalic acid, for example. Once the patterning is completed, annealing is performed in the temperature range of 200 to 250° C. This annealing renders the amorphous oxide conductive film polycrystalline.

Figure 6B:
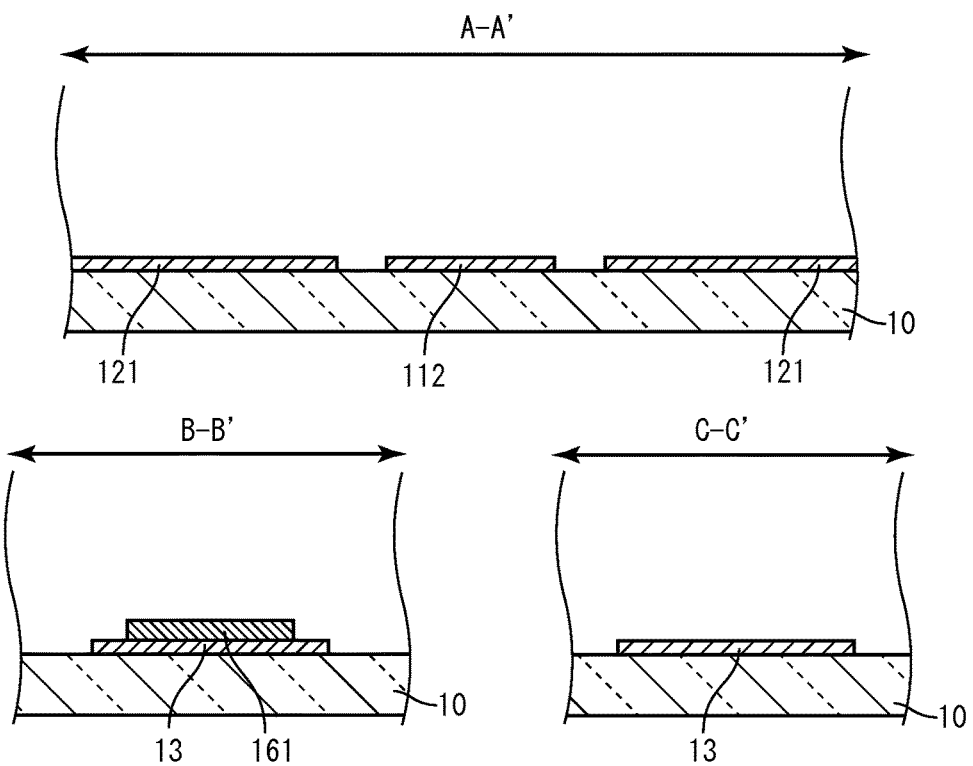
FIG. 6B shows cross-sections illustrating the method of manufacturing the touch panel according to the first embodiment of the present invention.

Next, as shown in FIG. 6B, lines 161 are formed. Although not shown in FIG. 6B, a ground line 162 is also formed in this step. First, a uniform metal film is formed by sputtering or vapor deposition, for example. Preferably, the metal film has a low resistance, and may be made of Al, for example. However, when Al is in contact with an oxide conductive film such as ITO, differences in ionization tendency may produce galvanic corrosion. In view of this, the metal film is preferably a laminate with a metal having a high corrosion resistance. The metal film may suitably be a laminate film of MoNb, Al and MoNb, a laminate film of MoN, Al and MoN, or laminate film of Mo, Al and Mo, for example. The thickness of the metal film may be in the range of 0.3 to 1.0 μm, for example. The metal film that has been formed is photolithographically patterned. More specifically, a mask made of photoresist is formed in the regions where lines 161 and ground line 162 are to be formed. Then, the uncovered portions are etched away. The etching may be performed using a mixture of phosphoric acid, acetic acid and nitric acid, for example.

Figure 6C:
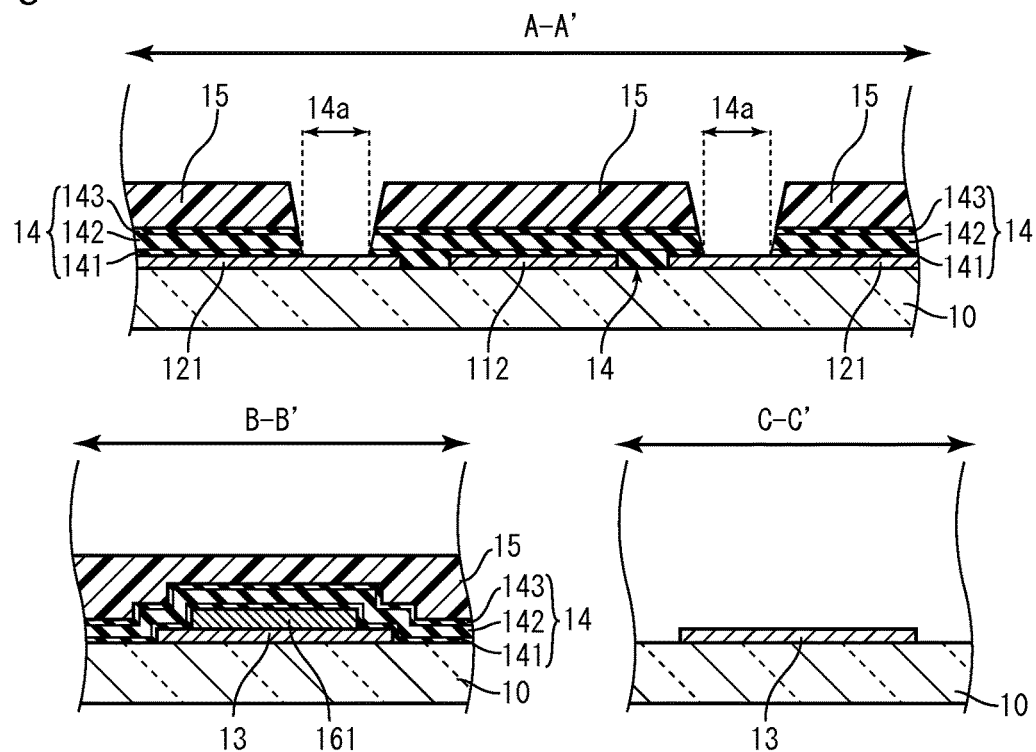
FIG. 6C shows cross-sections illustrating the method of manufacturing the touch panel according to the first embodiment of the present invention.

Next, as shown in FIG. 6C, a protection film 14 and insulating film 15 are formed. In this step, first, a film of silicon nitride that is to constitute a protection film 14 are formed. Thereafter, an insulating film 15 is formed using photoresist. Then, the insulating film 15 is used as a mask to etch the film of silicon nitride. Thus, contact holes 14a, 14b and 14c that extend through the insulating film 14 and protection film 15 are formed.

More specifically, first, a film of silicon nitride is formed by CVD, for example. As discussed above, the protection film 14 has a triple-layer construction having a first protection sub-film 141, a second protection sub-film 142 and a third protection sub-film 143, deposited in this order starting from the substrate 10. The refractive index of the second protection sub-film 142 is lower than that of the first protection sub-film, while the refractive index of the third protection sub-film 143 is higher than that of the second protection sub-film 142. Further, the thickness of the second protection sub-film 142 is not smaller than the total thickness of the first and third protection sub-films 141 and 143. The film of silicon nitride is formed while film forming conditions are changed so as to meet the above conditions.

Specifically, for example, the thickness of the first protection sub-film 141 may be in the range of 10 to 80 nm, the thickness of the second protection sub-film 142 in the range of 80 to 400 nm, and the thickness of the third protection sub-film 143 in the range of 10 to 80 nm. The thickness of the second protection sub-film 142 is not smaller than the total thickness of the first and third protection sub-films 141 and 143.

In the case of CVD, the refractive index of a film of silicon nitride can be regulated by adjusting temperature, the flow amount of material gas, and pressure, for example. To speak qualitatively, as the pressure decreases, the refractive index tends to increase; as the pressure increases, the refractive index tends to decrease. As the temperature increases (i.e. the high-frequency output increases), the refractive index tends to increase; as the temperature decreases (i.e. the high-frequency output decreases), the refractive index tends to decrease.

For example, a silicon nitride film may be formed under the conditions: $SiH_4$: 280 sccm; $NH_3$: 600 sccm; $N_2$: 4000 sccm; pressure: 140 Pa; RF power: 1500 W; and temperature: 230° C., resulting in a film with a refractive index of 1.805 or higher. Further, a silicon nitride film may be formed under the conditions: $SiH_4$: 220 sccm; $NH_3$: 900 sccm; $N_2$: 2000 sccm; pressure: 200 Pa; RF power: 800 W; and temperature: 200° C., resulting in a film with a refractive index below 1.805.

Next, photoresist is uniformly applied to cover the film of silicon nitride using a spin coater or slit coater, for example. The photoresist may have any thickness, for example in the range of 1.5 to 3.0 μm. The photoresist that has been formed is photolithographically patterned to form an insulating film 15. That is, contact holes are formed in the insulating film 15.

Subsequently, the insulating film 15 is used as a mask to etch the film of silicon nitride to form a protection film 14. Thus, contact holes 14a, 14b and 14c that extend through the protection film 14 and insulating film 15 are formed. The etching may be dry etching using a fluorine-containing gas, for example.

It should be noted that the insulating film 15 may be removed after this etching.

Figure 6D:
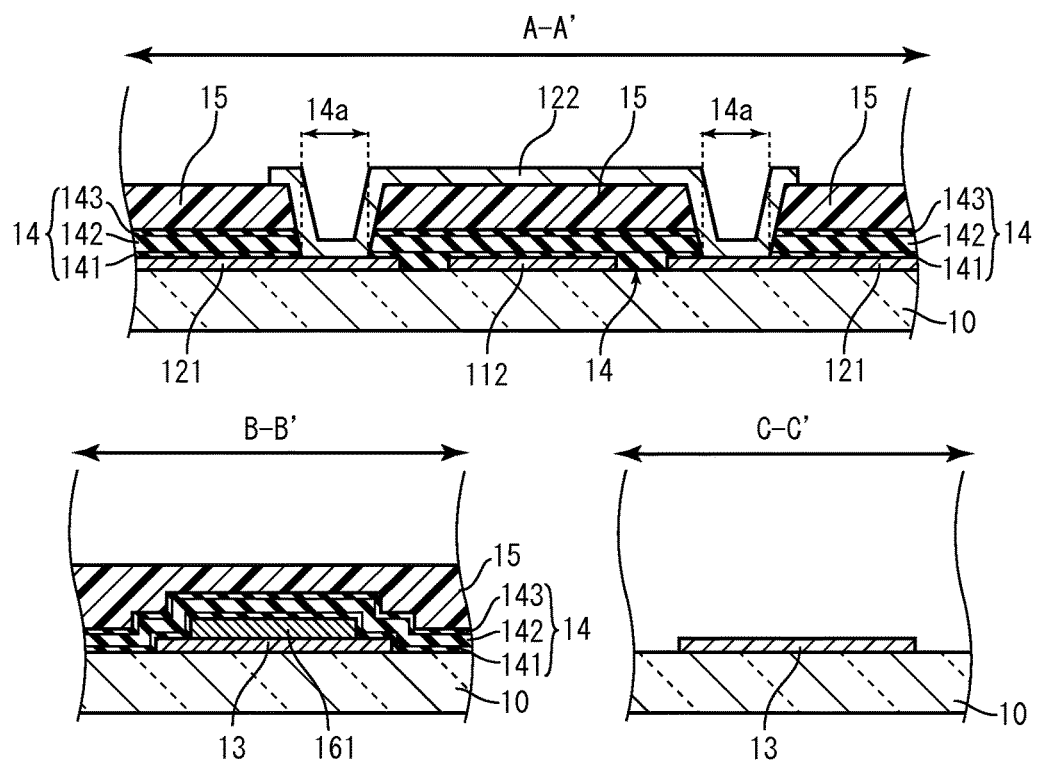
FIG. 6D shows cross-sections illustrating the method of manufacturing the touch panel according to the first embodiment of the present invention.

Next, as shown in FIG. 6D, connecting portions 122 for the Y electrodes 12 are formed. Although not shown in FIG. 6D, connecting portions 123 for the Y electrodes 12 are also formed in this step. First, a uniform oxide conductive film is formed by sputtering or CVD. The oxide conductive film may be made of ITO or IZO, for example. The thickness of the oxide conductive film may be in the range of 10 to 50 nm, for example. The oxide conductive film that has been formed is photolithographically patterned. More specifically, a mask made of photoresist is formed in the regions where connecting portions 122 and 123 are to be formed. Then, the uncovered portions are etched away. The etching may be performed using a mixture of phosphoric acid, acetic acid and nitric acid, or oxalic acid, for example. Once the patterning is completed, annealing may be performed to render the connecting portions 122 and 123 polycrystalline.

Figure 6E:
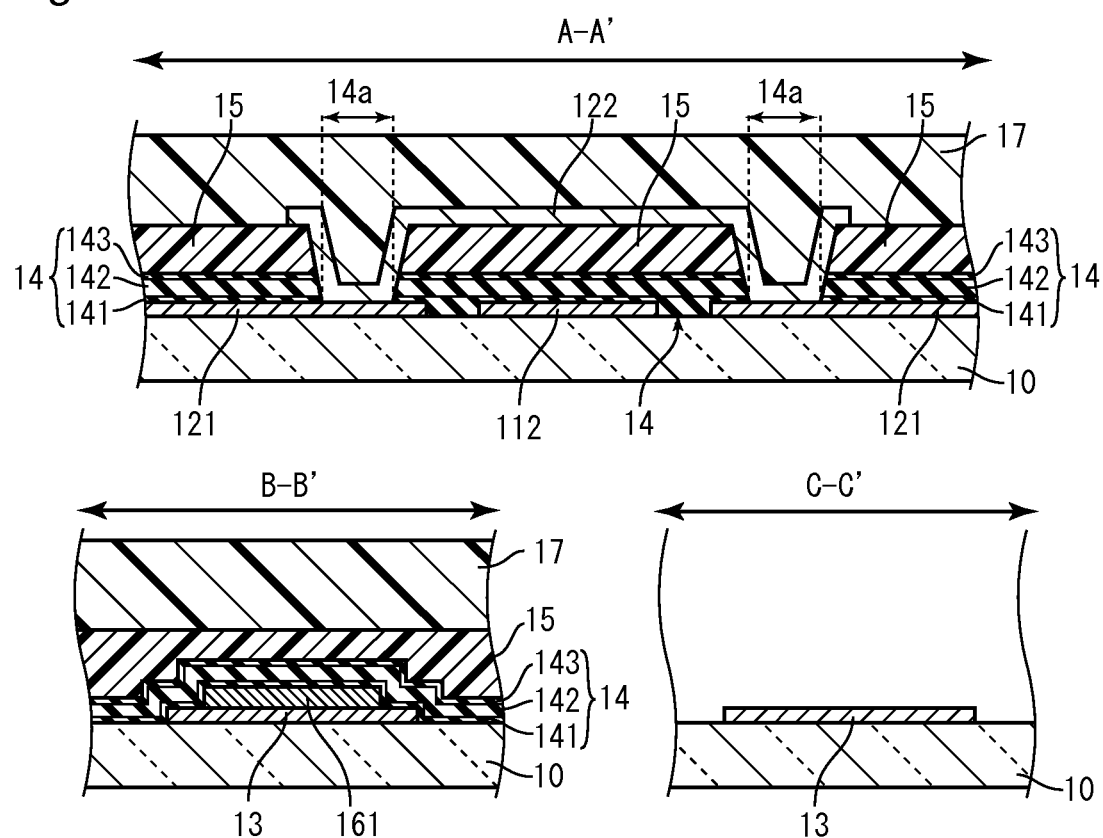
FIG. 6E shows cross-sections illustrating the method of manufacturing the touch panel according to the first embodiment of the present invention.

Lastly, as shown in FIG. 6E, an overcoat film 17 is formed generally over the entire surface of the substrate 10. The overcoat film 17 may be made of an organic or inorganic material. The organic material may be an acrylic resin, for example, and may be formed using a spin coater or slit coater. The inorganic material may be silicon nitride, for example, and may be formed by CVD. In any case, a mask or the like is used to form such an overcoat film 17 that will expose a portion of each of the terminals 13.

A construction of the touch panel 1 according to the first embodiment of the present invention and a method of manufacturing the panel have been described.

According to the present embodiment, the protection film 14 covering the lines 161 and ground line 162 is formed of a silicon nitride film. A silicon nitride film has a low moisture permeability and thus a high barrier performance. This provides an arrangement that prevents the lines 161 and ground line 162 from corroding, meaning a high reliability.

COMPARATIVE EXAMPLES

Figure 7:
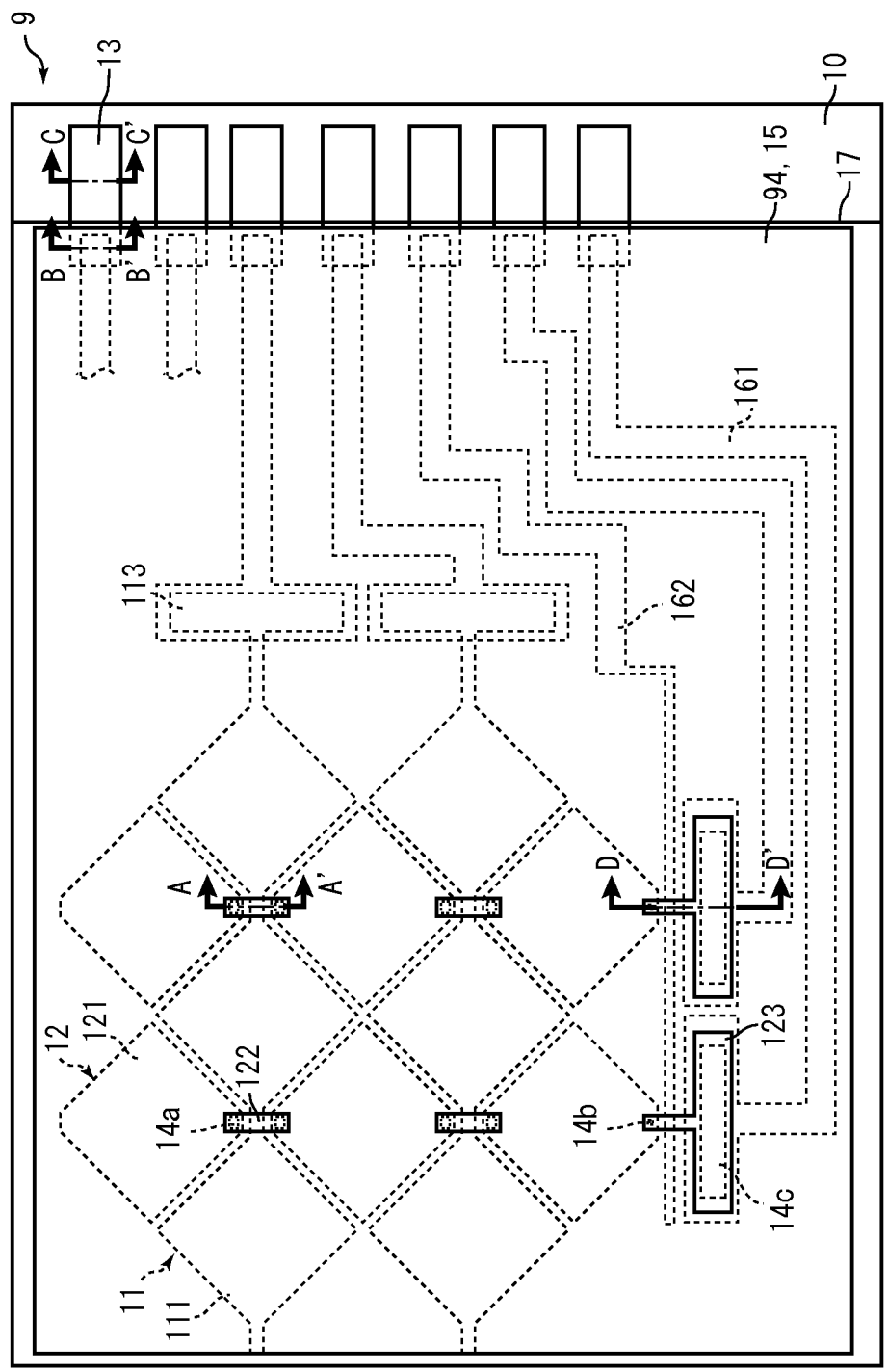
FIG. 7 is a schematic plan view of a comparative example of a touch panel.
Figure 8:
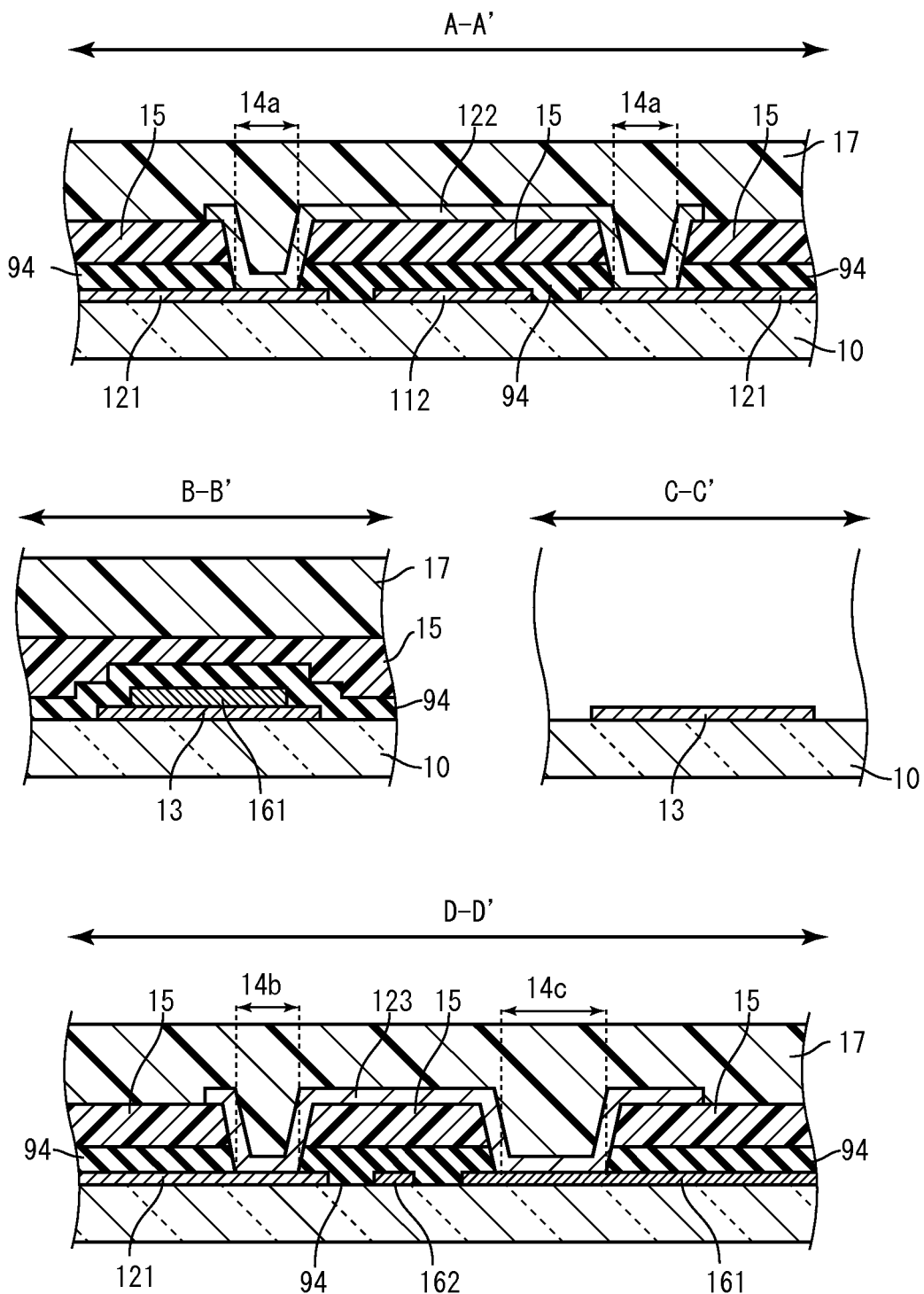
FIG. 8 shows cross-sections taken along lines A-A', B-B', C-C' and D-D' of FIG. 7.

To illustrate the advantages of the present embodiment, imaginary comparative examples will be described. FIG. 7 is a schematic plan view of a touch panel 9 according to a comparative example. FIG. 8 shows cross-sections taken along lines A-A', B-B', C-C' and D-D' of FIG. 7. The touch panel 9 includes a protection film 94 instead of the protection film 14 of the touch panel 1.

Similar to the protection film 14, the protection film 94 is formed of silicon nitride. However, the protection film 94 is different from the protection film 14 in that it has a single-layer construction.

Figure 9:
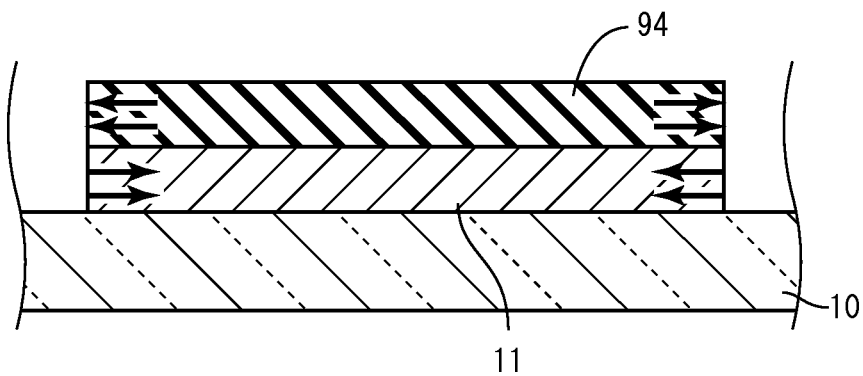
FIG. 9 schematically illustrates film stress in the oxide conductive film and the protection film on the oxide conductive film of the comparative example.
Figure 10:
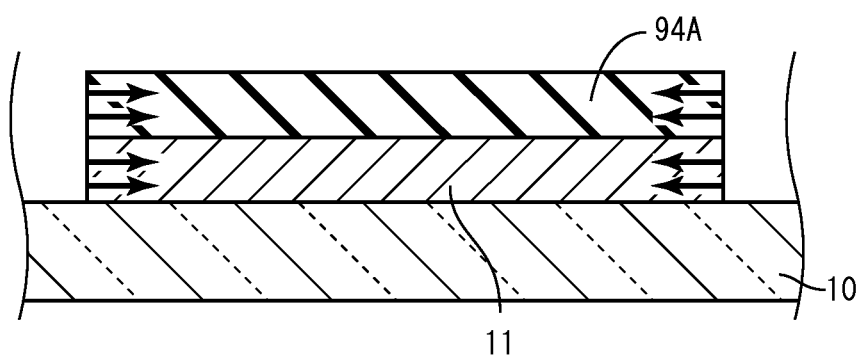
FIG. 10 schematically illustrates film stress in the oxide conductive film and the protection film on the oxide conductive film of another comparative example.
Figure 11:
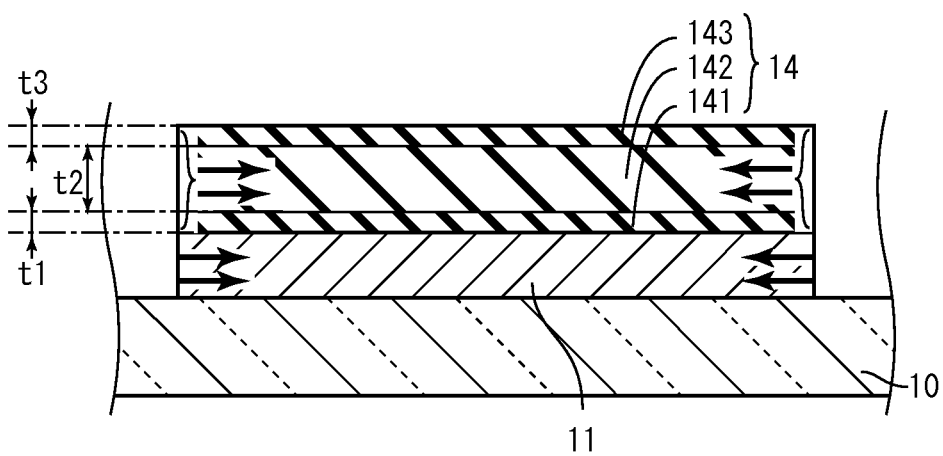
FIG. 11 schematically illustrates film stress in the oxide conductive film and the protection film on the oxide conductive film of the first embodiment of the present invention.

FIG. 9 schematically illustrates film stress in the oxide conductive film (for example, an X electrode 11) and the protection film 94 on the oxide conductive film. In FIGS. 9 to 11, the types of film stress are schematically indicated by arrows in different directions. The film stress in an oxide conductive film is typically tensile. On the other hand, the film stress in a protection film 94 formed of silicon nitride is typically compressive. As shown in FIG. 9, the X electrode 11 and the protection film 94 have different types of film stress such that the protection film 94 on the X electrode 11 exhibits poor adhesion to the electrode, and thus can easily peel off.

It is possible to change film forming conditions so as to form a silicon nitride film with tensile film stress. FIG. 10 schematically illustrates film stress in the oxide conductive film (for example, an X electrode 11) and the protection film 94A on the oxide conductive film. The protection film 94A has tensile film stress. As shown in FIG. 10, the X electrode 11 and protection film 94A have the same type of film stress and exhibit good adhesion.

However, a silicon nitride film with tensile film stress is coarse, and has a large number of dangling bonds, which means a highly reactive film. If a silicon nitride film with tensile film stress is in contact with an oxide conductive film, heat applied in subsequent manufacturing steps may result in oxidation-reduction, causing these films to deteriorate. Further, if a silicon nitride film with tensile film stress is exposed to the atmosphere, it may deteriorate, too. More specifically, the silicon nitride film becomes a silicon oxynitride film, which means decreased barrier performance, while the oxide conductive film is metallized, which means decreased optical transmittance.

The higher the refractive index of a silicon nitride film, the greater the tendency of the film to have compressive film stress. Further, the lower the refractive index of a silicon nitride film, the greater the tendency of the film to have tensile film stress. For example, if a silicon nitride film has a refractive index below 1.805, it may have tensile film stress.

FIG. 11 illustrates the advantages of the protection film 14 of the first embodiment of the present invention replacing the protection film 94 or 94A of the comparative examples. In the present embodiment, the second protection sub-film 142, which has a relatively low refractive index, is sandwiched by the first and third protection sub-films 141 and 143, which have a relatively high refractive index. Thus, the second protection sub-film 142, which has a relatively high reactivity, is not exposed. Further, the thickness of the second protection sub-film 142, t2, is not smaller than the total thickness of the first and third protection sub-films 141 and 143, t1+t3, to adjust the film stress of the protection film 14 taken as a whole to be rather tensile. This prevents the protection film 14 from peeling off even if the protection film 14 is provided in contact with the oxide conductive film (for example, an X electrode 11).

In the present embodiment, the protection film 14 is provided in contact with the X and Y electrodes 11 and 12. More specifically, the protection film 14 is provided over the X electrodes 11 and the insular electrodes 121 of the Y electrodes 12. In the present embodiment, the protection film 14 protects the lines 161 and ground line 162 and also serves as an interlayer insulating film for insulating the X electrodes 11 from the Y electrodes 12. This reduces the number of patterning. That is, if the protection film 14 is not to be in contact with the X and Y electrodes 11 and 12, after the protection film 14 is patterned, a separate interlayer insulating film for insulating the X electrodes 11 from the Y electrodes 12 must be formed; in the present embodiment, the step of forming such a separate interlayer insulating film need not be performed.

More preferably, the second protection sub-film 142 has tensile film stress, and the protection film 14 taken as a whole has tensile film stress. As such, as shown in FIG. 11, the X electrode 11 and protection film 14 have the same type of film stress, further improving adhesiveness.

The protection film 14 may be formed by CVD, for example. Accordingly, from a production viewpoint, the thinner the protection film 14, the better it is. As discussed above, the thickness of the second protection sub-film 142, t2, is not smaller than the total thickness of the first and third protection sub-films 141 and 143, t1+t3. Thus, the smaller the thickness t1 of the first protection sub-film 141 and the thickness t3 of the third protection sub-film 143, the better they are. Preferably, the thickness t1 of the first protection sub-film 141 and the thickness t3 of the third protection sub-film 143 are no greater than 100 nm each.

[Second Embodiment]

Figure 12:
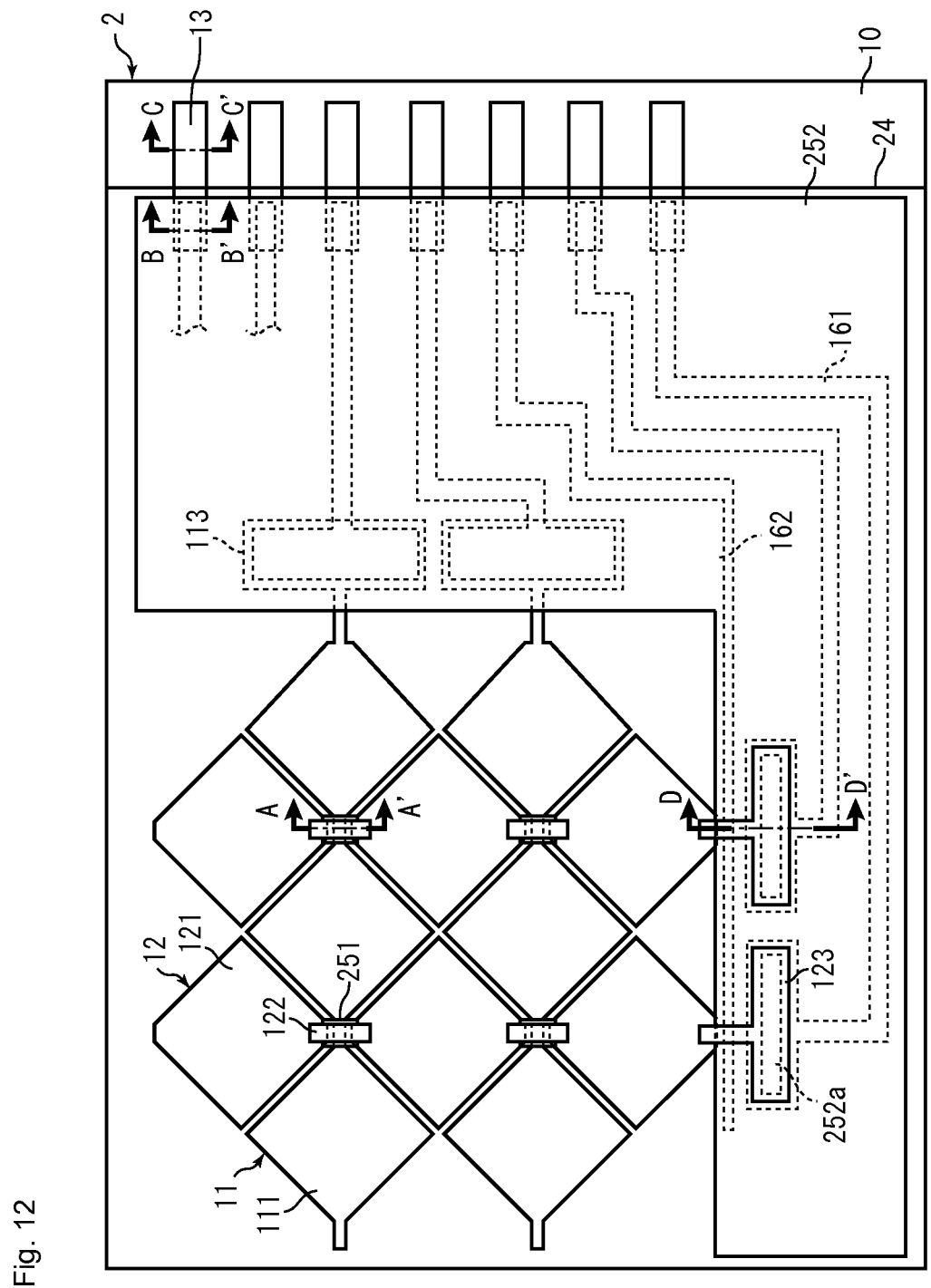
FIG. 12 is a schematic plan view of a touch panel according to a second embodiment of the present invention.
Figure 13:
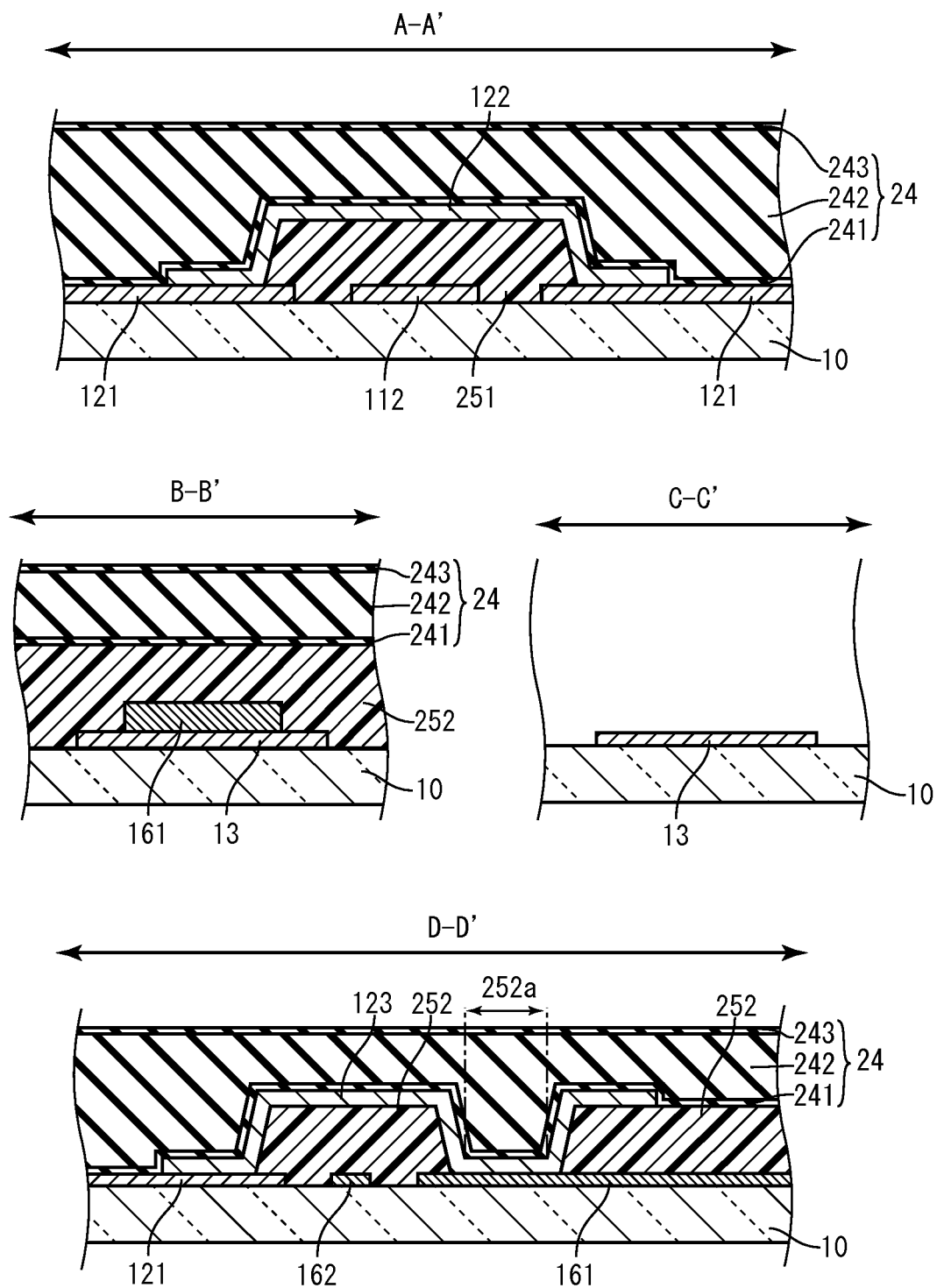
FIG. 13 shows cross-sections taken along lines A-A', B-B', C-C' and D-D' of FIG. 12.

The touch panel-equipped display device 100 may include any one of the touch panels 2 to 5 described below instead of the touch panel 1. FIG. 12 is a schematic plan view of a touch panel 2 according to a second embodiment of the present invention. FIG. 13 shows cross-sections taken along lines A-A', B-B', C-C' and D-D' of FIG. 12. The touch panel 2 includes a substrate 10, X electrodes 11, Y electrodes 12, terminals 13, a protection film 24, insulating films 251 and 252, lines 161 and a ground line 162.

The touch panel 2 includes the insulating films 251 and 252 instead of the insulating film 15 of the touch panel 1. As shown in FIG. 12, an insulating film 251 is provided at the intersection of an X electrode 11 and a Y electrode 12, insulating the X electrode 11 from the Y electrode 12. More specifically, the insulating films 251 are located in a layer between the connecting portions 112 of the X electrodes 11 and the connecting portions 122 of the Y electrodes 12. The insulating film 252 is provided over the lines 161 and ground line 162, protecting the lines 161 and ground line 162. The insulating film 252 also serves as an interlayer insulating film for insulating the connecting portions 123 of the Y electrodes 12 from the ground line 162. The connecting portion 123 of a Y electrode 12 is connected with the associated line 161 via a contact hole 252a formed in the insulating film 252. The insulating films 251 and 252 may be made of an organic or inorganic material.

The touch panel 2 includes the protection film 24 instead of the protection film 14 of the touch panel 1. The protection film 24 is different from the protection film 14 in that it is provided over a portion of each of the terminals 13, the X electrodes 11, the Y electrodes 12 and the insulating films 251 and 252.

Similar to the protection film 14, the protection film 24 has a triple-layer construction having a first protection sub-film 241, a second protection sub-film 242 with a lower refractive index than the first protection sub-film 241, and a third protection sub-film 243 with a higher refractive index than the second protection sub-film 242, deposited in this order starting from the substrate 10. Similar to the corresponding sub-film of the protection film 14, the second protection sub-film 242 has a thickness that is not smaller than the total thickness of the first and third protection sub-films 241 and 243.

[Method of Manufacturing Touch Panel 2]

Figure 14A:
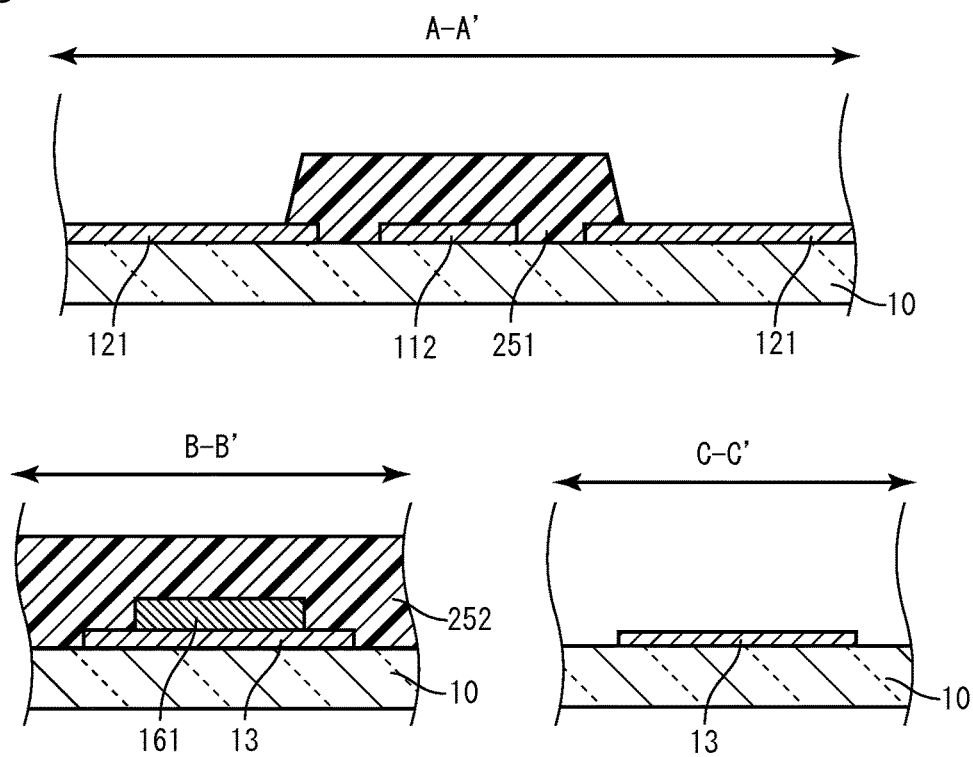
FIG. 14A shows cross-sections illustrating a method of manufacturing the touch panel according to the second embodiment of the present invention.
Figure 14B:
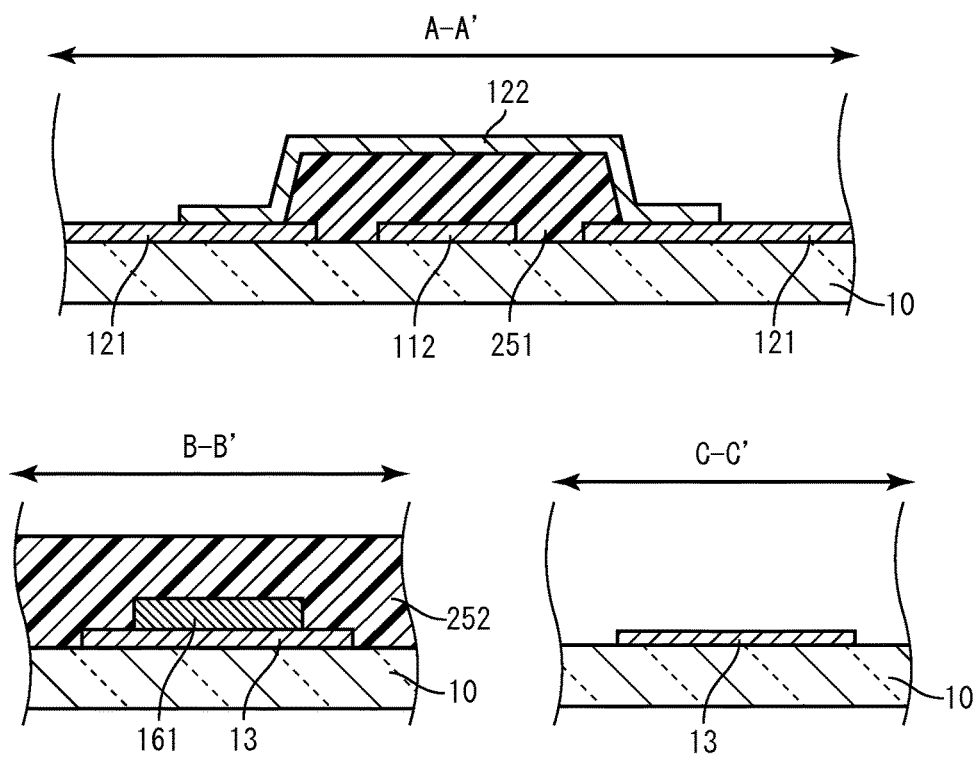
FIG. 14B shows cross-sections illustrating the method of manufacturing the touch panel according to the second embodiment of the present invention.
Figure 14C:
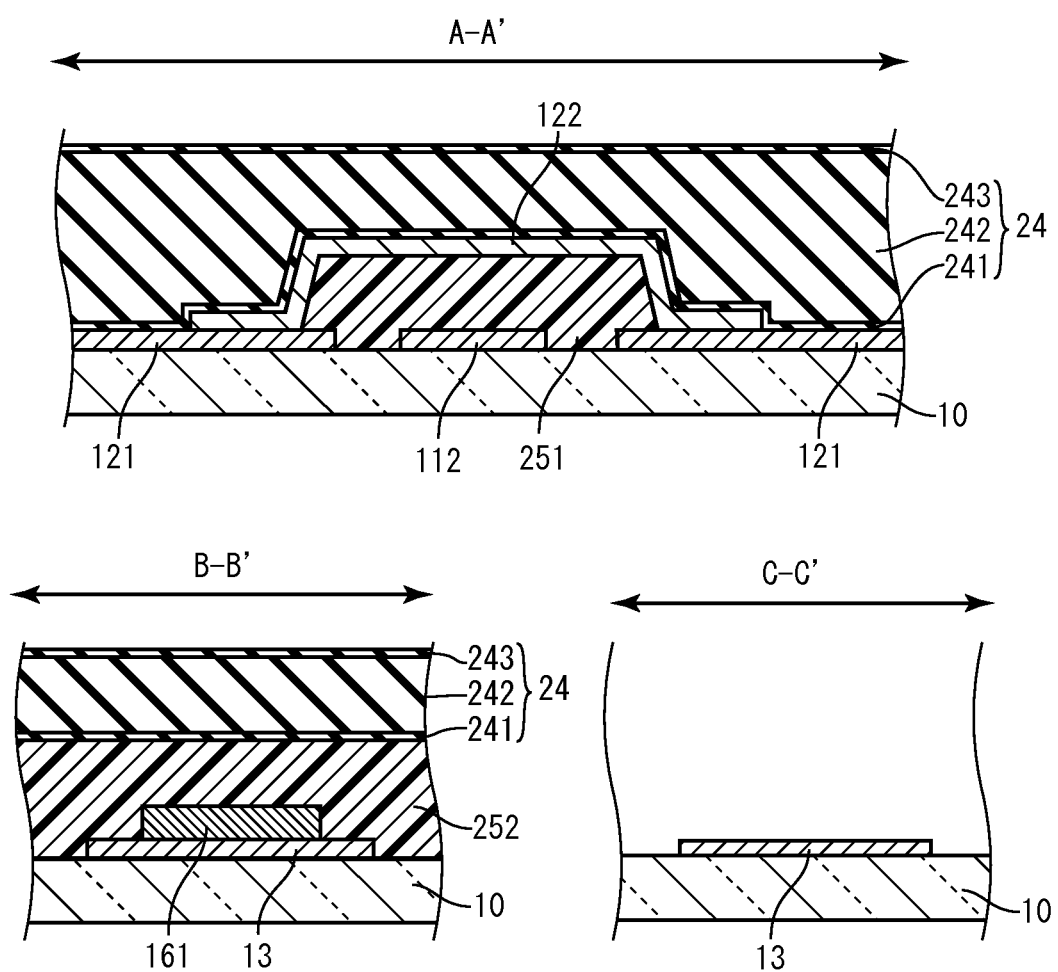
FIG. 14C shows cross-sections illustrating the method of manufacturing the touch panel according to the second embodiment of the present invention.

A method of manufacturing the touch panel 2 will be briefly described below with reference to FIGS. 14A to 14C. FIGS. 14A to 14C show cross-sections taken along lines A-A', B-B' and C-C' of FIG. 12.

First, on a substrate 10 are formed insular electrodes 111 and connecting portions 112 and 113 for X electrodes 11, insular electrodes 121 for Y electrodes 12, and terminals 13. Subsequently, lines 161 and a ground line 162 are formed. These steps are the same as those for the touch panel 1, and thus they are not illustrated in drawings (see FIGS. 6A and 6B).

Next, as shown in FIG. 14A, insulating films 251 and 252 are formed. The insulating films 251 and 252 may be made of an organic or inorganic material.

An implementation where the insulating films 251 and 252 are made of an organic material will be described. The organic material may be a photoresist containing an acrylic resin or novolak resin, for example. Photoresist is uniformly applied generally to the entire surface of the substrate 10 using a spin coater or slit coater. The photoresist that has been formed is photolithographically patterned to form insulating films 251 and 252. At this time, contact holes 252a are also formed.

An implementation where the insulating films 251 and 252 are made of an inorganic material will be described. The inorganic material may be, for example, silicon nitride, silicon oxide or silicon oxynitride. A uniform film of such a material is formed generally on the entire surface of the substrate 10 by CVD. The film that has been formed is photolithographically patterned. More specifically, a mask made of photoresist is formed in the regions where insulating films 251 and 252 are to be formed. Then, the uncovered portions are etched away. At this time, contact holes 252a are formed. The etching may be dry etching using a fluorine-containing gas, for example.

Next, as shown in FIG. 14B, connecting portions 122 for the Y electrodes 12 are formed. Although not shown in FIG. 14B, connecting portions 123 for the Y electrodes 12 are also formed in this step.

Lastly, as shown in FIG. 14C, a protection film 24 is formed generally over the entire surface of the surface 10. More specifically, a silicon nitride film is formed by CVD, for example. Similar to the protection film 14, a first protection sub-film 241, a second protection sub-film 242 and a third protection sub-film 243 are formed while film forming conditions are changed. Here, the protection film 24 is formed using a mask or the like such that a portion of each of the terminals 13 is exposed.

An overcoat film of an organic material may further be formed over the protection film 24. Covering the protection film 24 of an inorganic material with an overcoat film of an organic material provides an arrangement that is more resistant to an impact, such as a touch.

A construction of the touch panel 2 according to the second embodiment of the present invention and a method of manufacturing the panel have been described. The present embodiment also provides the same advantages as the touch panel 1.

[Third Embodiment]

Figure 15:
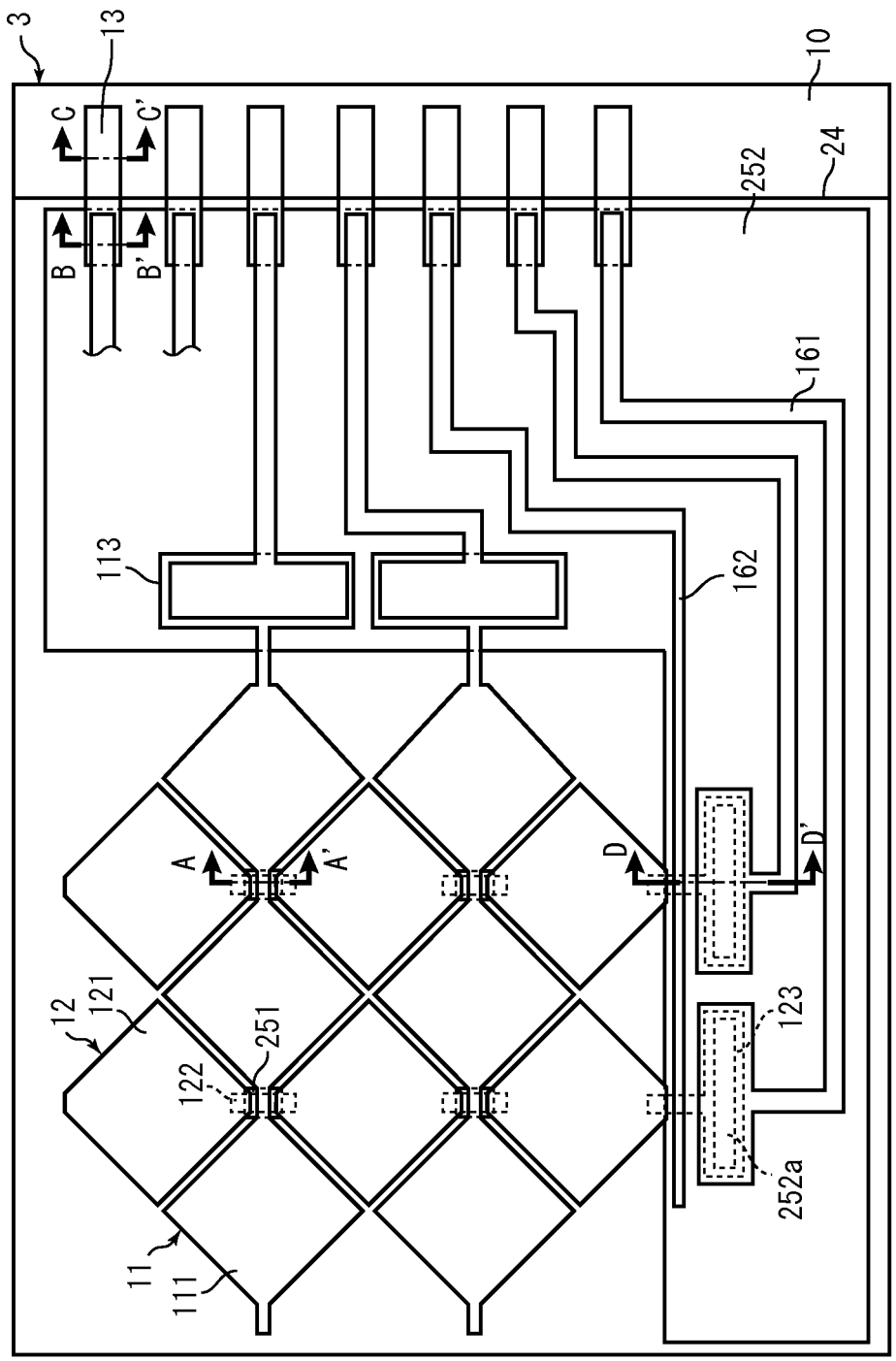
FIG. 15 is a schematic plan view of a touch panel according to a third embodiment of the present invention.
Figure 16:
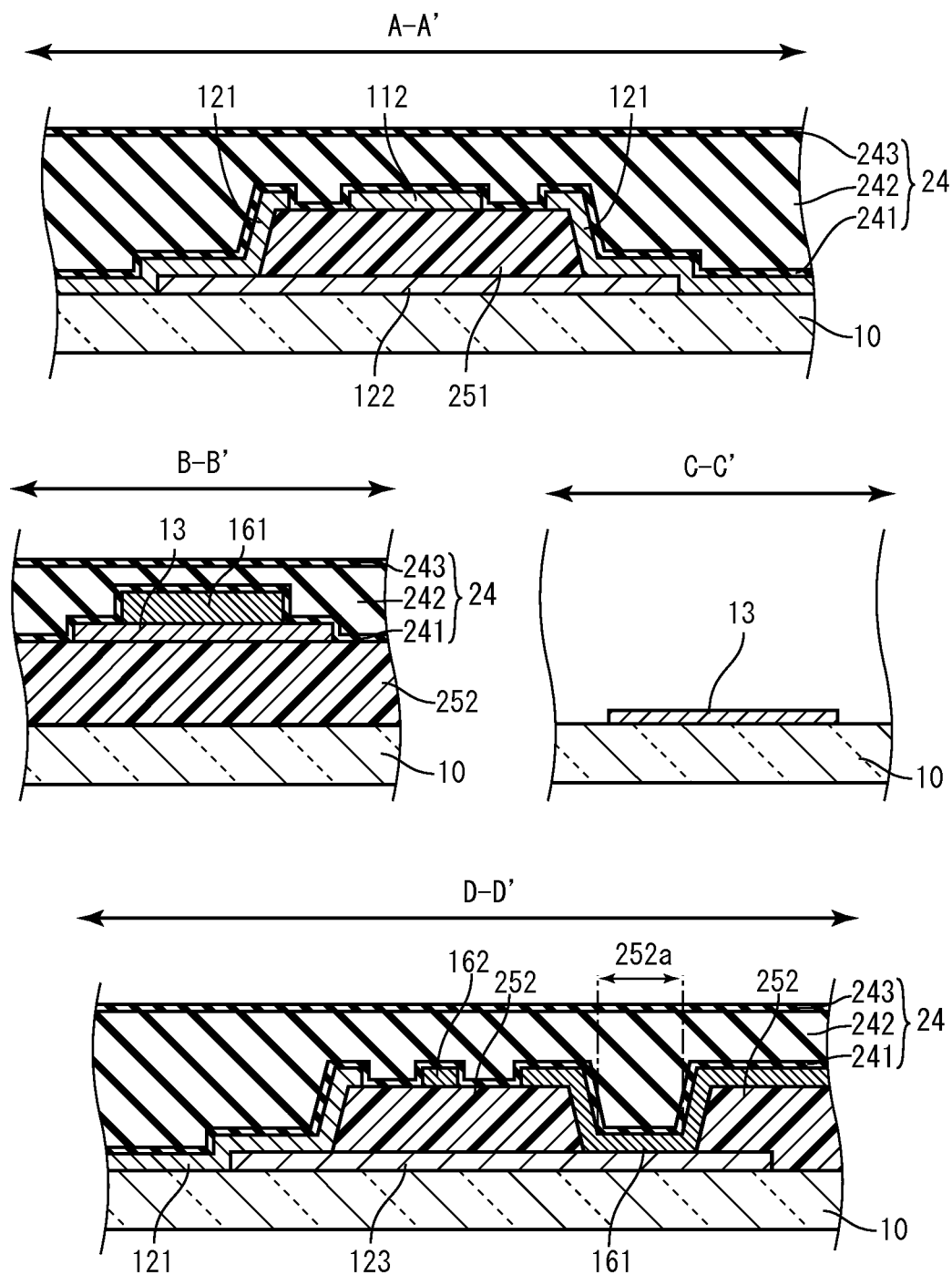
FIG. 16 shows cross-sections taken along lines A-A', B-B', C-C' and D-D' of FIG. 15.

FIG. 15 is a schematic plan view of a touch panel 3 according to a third embodiment of the present invention. FIG. 16 shows cross-sections taken along lines A-A', B-B', C-C' and D-D' of FIG. 13.

The touch panel 3 is different from the touch panel 2 in terms of the order in which the components are formed. As such, the films are deposited in a different order.

[Method of Manufacturing Touch Panel 3]

A method of manufacturing the touch panel 3 will be briefly described with reference to FIGS. 17A to 17E. FIGS. 17A to 17E show cross-sections taken along lines A-A', B-B' and C-C' of FIG. 15.

Figure 17A:
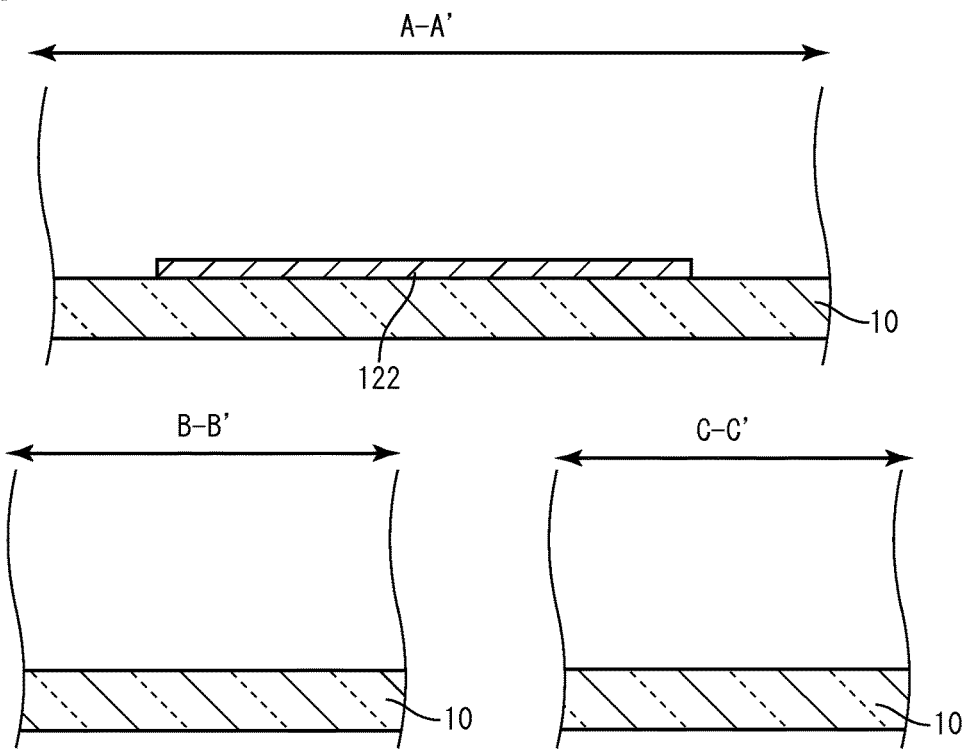
FIG. 17A shows cross-sections illustrating a method of manufacturing the touch panel according to the third embodiment of the present invention.

First, as shown in FIG. 17A, connecting portions 122 for Y electrodes 12 are formed. Although not shown in FIG. 17A, connecting portions 123 for the Y electrodes 12 are also formed in this step.

Figure 17B:
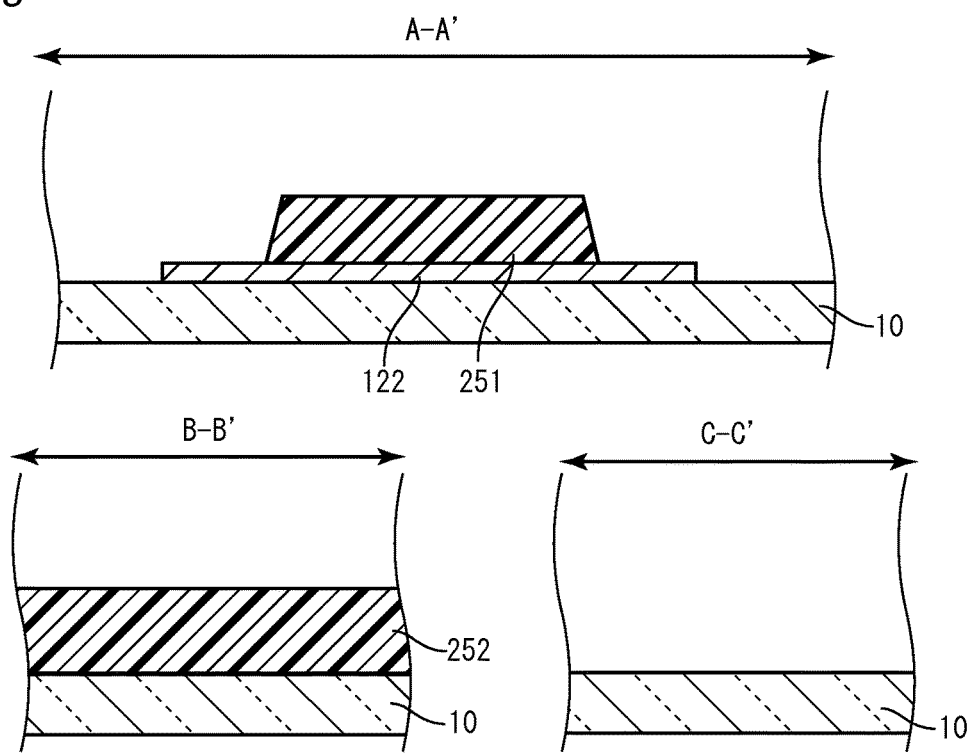
FIG. 17B shows cross-sections illustrating the method of manufacturing the touch panel according to the third embodiment of the present invention.

Next, as shown in FIG. 17B, insulating films 251 and 252 are formed.

Figure 17C:
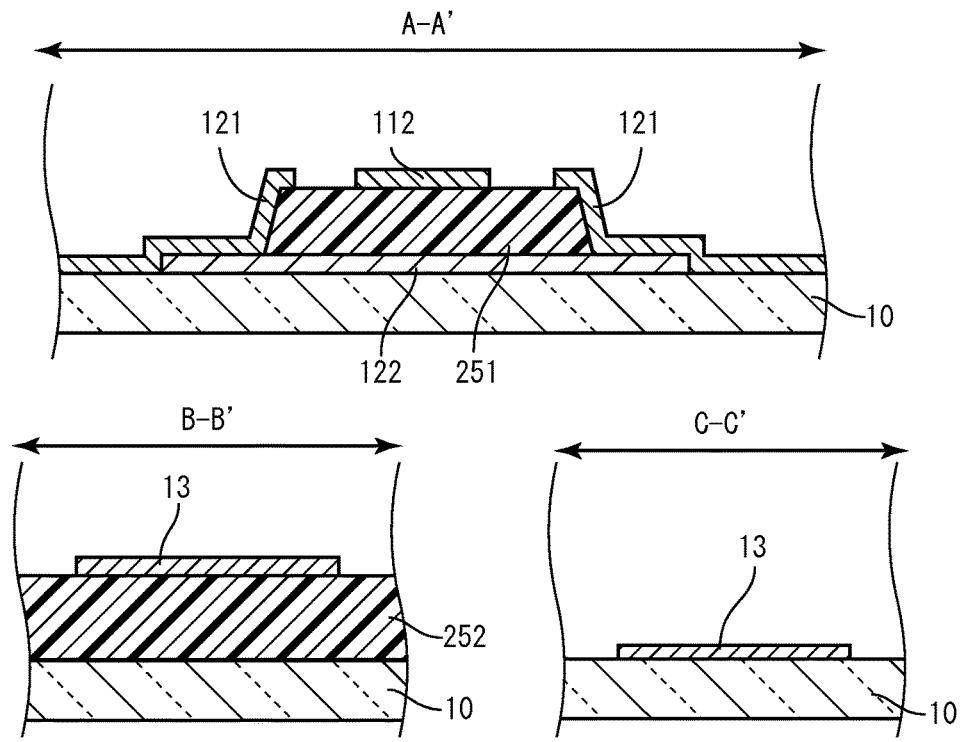
FIG. 17C shows cross-sections illustrating the method of manufacturing the touch panel according to the third embodiment of the present invention.

Next, as shown in FIG. 17C, connecting portions 112 for X electrodes 11, insular electrodes 121 for the Y electrodes 12, and terminals 13 are formed. Although not shown in FIG. 17C, insular electrodes 111 and connecting portions 113 for the X electrodes 111 are also formed in this step.

Figure 17D:
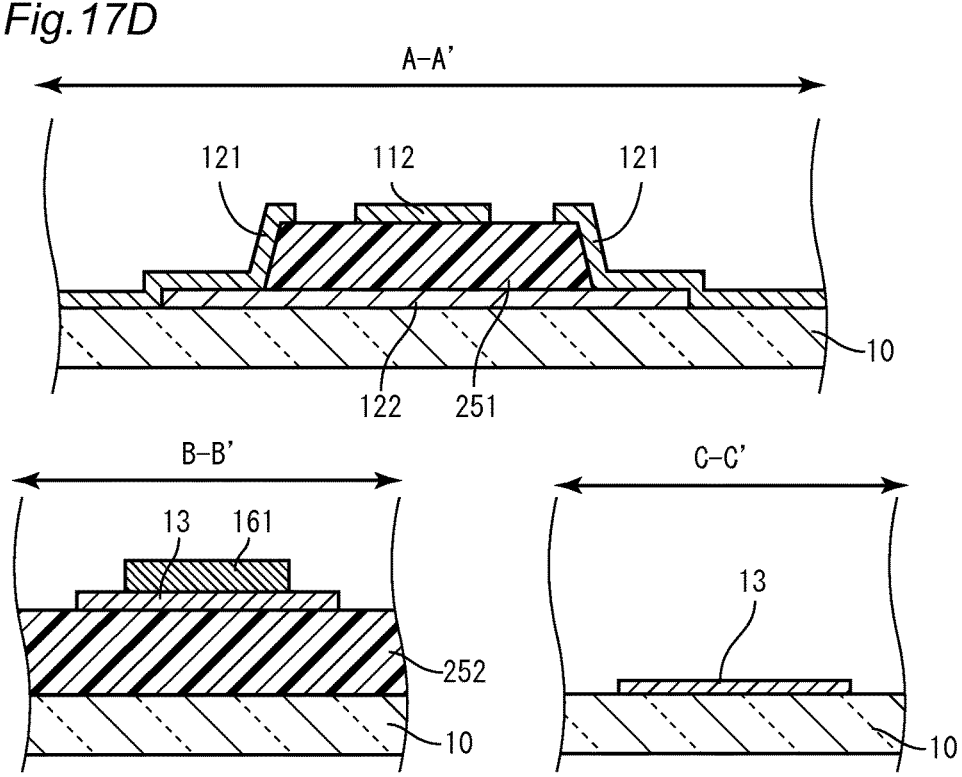
FIG. 17D shows cross-sections illustrating the method of manufacturing the touch panel according to the third embodiment of the present invention.

Next, as shown in FIG. 17D, lines 161 are formed. Although not shown in FIG. 17D, a ground line 162 is also formed in this step.

Figure 17E:
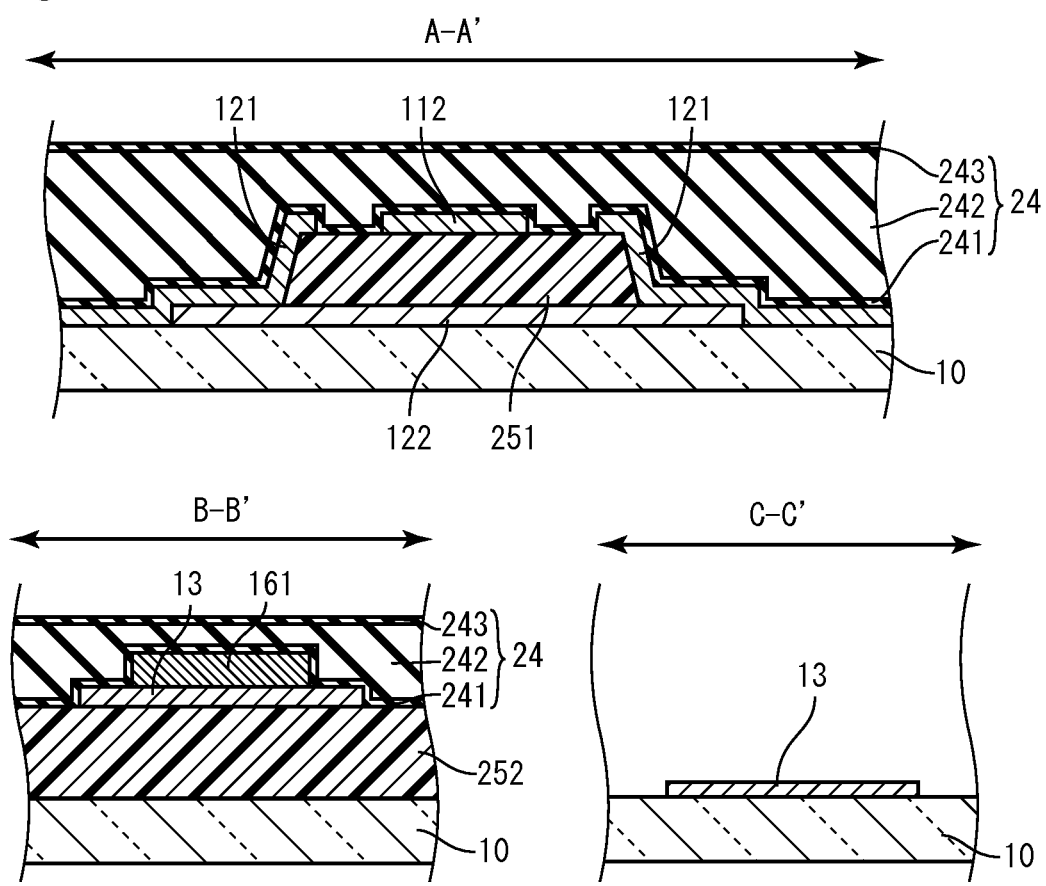
FIG. 17E shows cross-sections illustrating the method of manufacturing the touch panel according to the third embodiment of the present invention.

Lastly, as shown in FIG. 17E, a protection film 24 is formed generally over the entire surface of the substrate 10. Again, an overcoat film of an organic material may further be formed over the protection film 24.

A construction of the touch panel 3 according to the third embodiment of the present invention and a method of manufacturing the panel have been described. The present embodiment also provides the same advantages as the touch panels 1 and 2.

[Fourth Embodiment]

Figure 18:
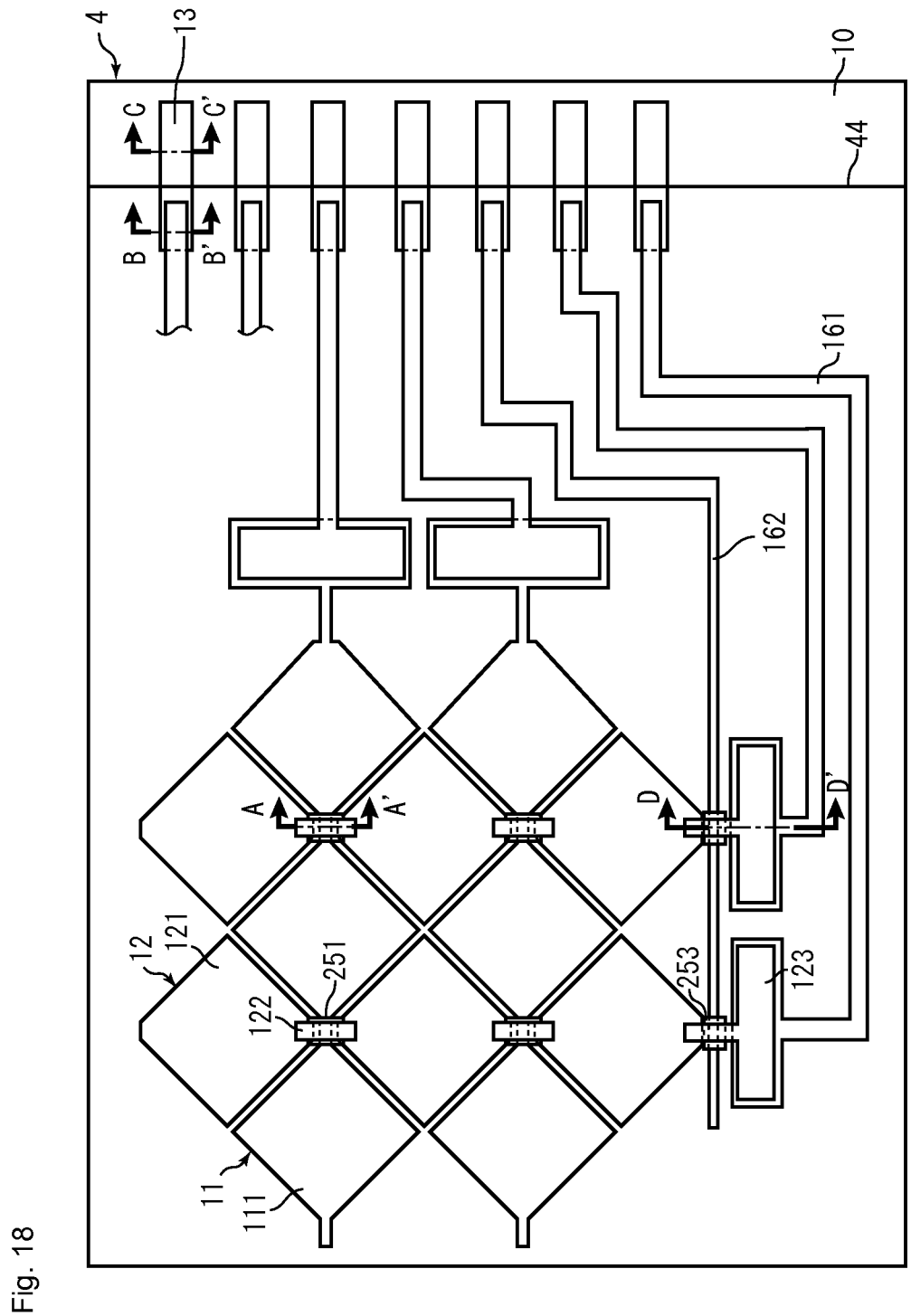
FIG. 18 is a schematic plan view of a touch panel according to a fourth embodiment of the present invention.
Figure 19:
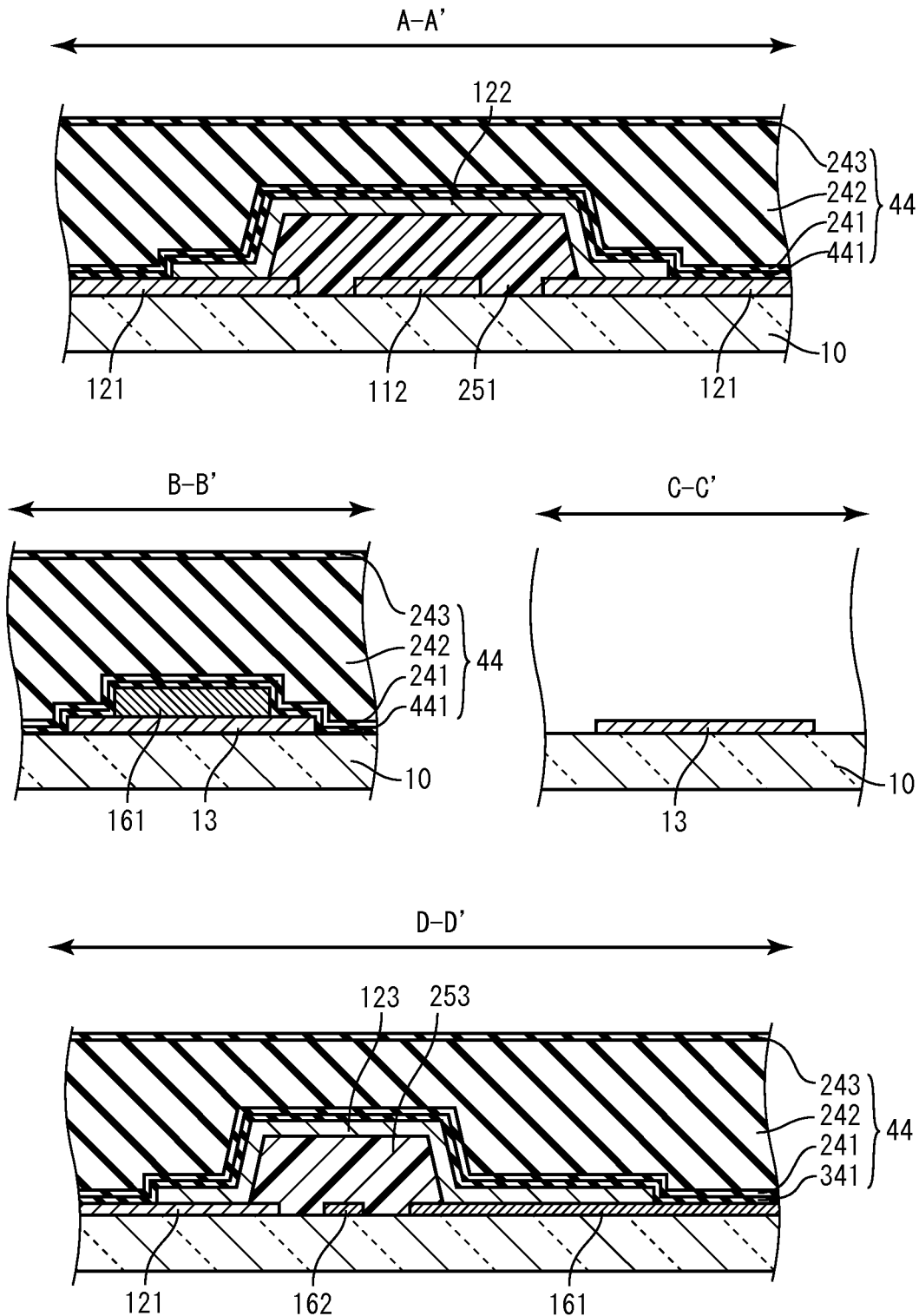
FIG. 19 shows cross-sections taken along lines A-A', B-B', C-C' and D-D' of FIG. 18.

FIG. 18 is a schematic plan view of a touch panel 4 according to a fourth embodiment of the present invention. FIG. 19 shows cross-sections taken along lines A-A', B-B', C-C' and D-D' of FIG. 18. The touch panel 4 includes a substrate 10, X electrodes 11, Y electrodes 12, terminals 13, a protection film 44, insulating films 251 and 253, lines 161 and a ground line 162.

The touch panel 4 includes the insulating films 253 instead of the insulating film 252 of the touch panel 2. As shown in FIG. 18, an insulating film 253 is provided at the intersection of the connecting portion 123 of a Y electrode 12 and the ground line 162, insulating the connecting portion 123 from the ground line 162. Similar to the insulating film 252, the insulating films 253 may be made of an organic or inorganic material.

The touch panel 4 includes the protection film 44 instead of the protection film 24 of the touch panel 2. Similar to the protection film 24, the protection film 44 is provided over a portion of each of the terminals 13, the X electrodes 11, the Y electrodes 12 and the insulating films 251 and 253.

Similar to the protection film 24, the protection film 44 includes a first protection sub-film 241, a second protection sub-film 242, and a third protection sub-film 243, formed of silicon nitride. The protection film 44 further includes a fourth protection sub-film 441 formed of silicon oxide. The first protection sub-film 241 is located on the fourth protection sub-film 441. That is, the protection film 44 has a quadruple-layer construction having a fourth protection sub-film 441, a first protection sub-film 241, a second protection sub-film 242 and a third protection sub-film 243 deposited in this order starting from the substrate 10.

Similar to the corresponding sub-film of the protection film 24, the second protection sub-film 242 has a lower refractive index than the first and second protection sub-films 241 and 243. The refractive index of the fourth protection sub-film 441 may be in the range of 1.4 to 1.6, for example.

In the present embodiment, the thickness of the second protection sub-film 242 is not smaller than the total thickness of the first, third and fourth protection sub-films 241, 243 and 441.

[Method of Manufacturing Touch Panel 4]

Figure 20A:
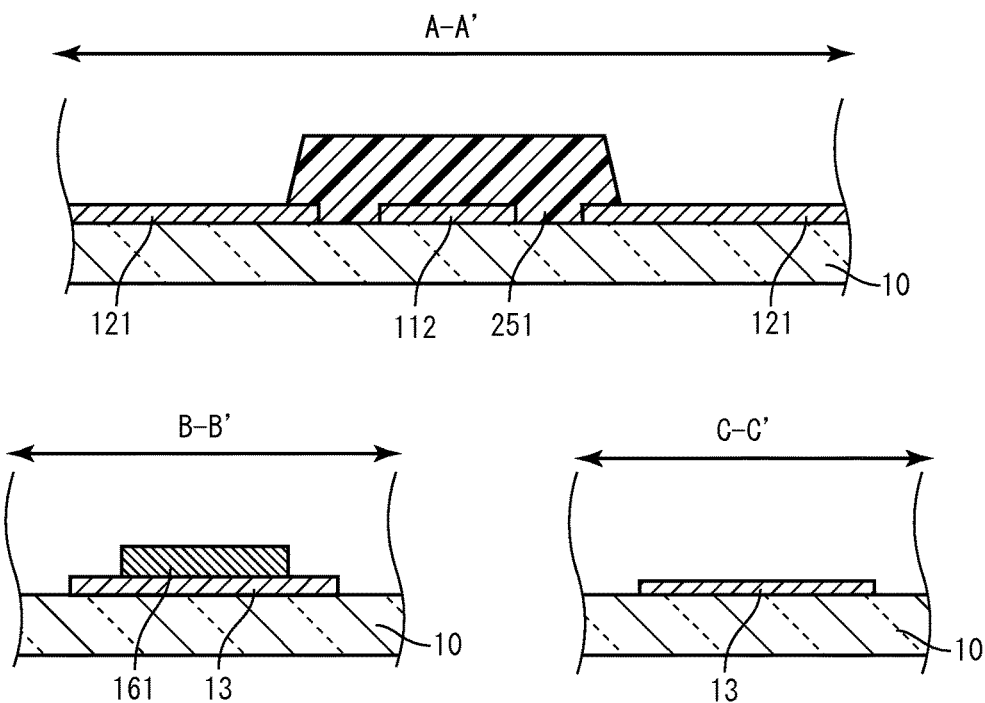
FIG. 20A shows cross-sections illustrating a method of manufacturing the touch panel according to the fourth embodiment of the present invention.
Figure 20B:
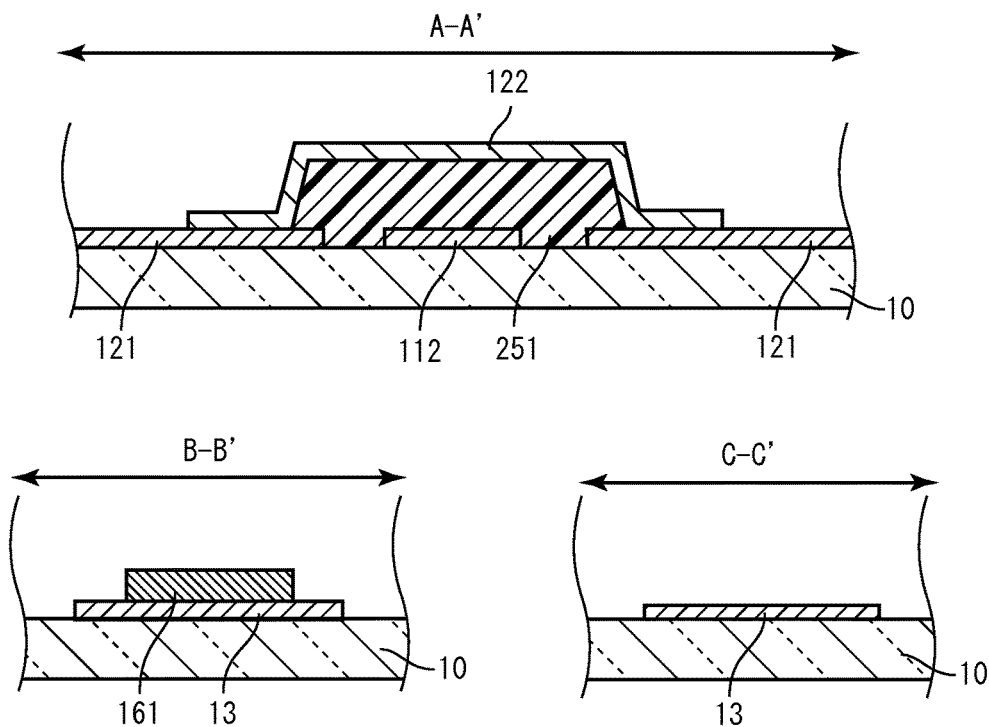
FIG. 20B shows cross-sections illustrating the method of manufacturing the touch panel according to the fourth embodiment of the present invention.

A method of manufacturing the touch panel 4 will be briefly described below with reference to FIGS. 20A to 20C. FIGS. 20A to 20C show cross-sections taken along lines A-A', B-B' and C-C' of FIG. 18.

First, on a substrate 10 are formed insular electrodes 111 and connecting portions 112 and 113 for X electrodes 11, insular electrodes 121 for Y electrodes 12, and terminals 13. Subsequently, lines 161 and a ground line 162 are formed. These steps are the same as those for the touch panels 1 and 2, and thus they are not illustrated in drawings (see FIGS. 6A and 6B).

Next, as shown in FIG. 20A, insulating films 251 are formed. Although not shown in FIG. 20A, insulating films 253 are also formed in this step. The insulating films 251 and 253 are formed by the same method as the insulating films 251 and 252 of the touch panels 2 and 3.

Next, as shown in FIG. 20B, connecting portions 122 for the Y electrodes 12 are formed. Although not shown in FIG. 20B, connecting portions 123 for the Y electrodes 12 are also formed in this step. The connecting portions 122 and 123 are formed by generally the same method as the corresponding elements of the touch panels 1 to 3. In the present embodiment, the lines 161 and ground line 162 are exposed; however, only the oxide conductive film may be etched by conducting selective etching using oxalic acid during patterning.

Lastly, as shown in FIG. 20C, a protection film 44 is formed generally over the entire surface of the substrate 10. More specifically, first, a fourth protection sub-film 441 of silicon oxide is formed by CVD, for example. Subsequently, a silicon nitride film is formed by CVD, for example. Similar to the protection film 24, a first protection sub-film 241, a second protection sub-film 242 and a third protection sub-film 243 are formed while film forming conditions are changed. Here, the protection film 44 is formed using a mask or the like such that a portion of each of the terminals 13 is exposed.

Specifically, for example, the thickness of the fourth protection sub-film 441 may be in the range of 10 to 80 nm, the thickness of the first protection sub-film 241 may be in the range of 10 to 80 nm, the thickness of the second protection sub-film 242 in the range of 80 to 400 nm, and the thickness of the third protection sub-film 243 in the range of 10 to 80 nm. The thickness of the second protection sub-film 242 is not smaller than the total thickness of the first, third and fourth protection sub-films 241, 243 and 441.

Again, an overcoat film of an organic material may further be formed over the protection film 44.

A construction of the touch panel 4 according to the fourth embodiment of the present invention and a method of manufacturing the panel have been described. In the present embodiment, the protection film 44 additionally includes a fourth protection sub-film formed of silicon oxide, which has good adhesion to an oxide conductive film. This improves adhesion of the protection film 44 to the oxide conductive film.

FIG. 21 schematically illustrates film stress in the oxide conductive film (for example, an X electrode 11) and the protection film 44 on the oxide conductive film. Similar to FIGS. 9 to 11, FIG. 21 shows arrows in different directions that schematically indicate the types of film stress. The film stress in the fourth protection sub-film 441 formed of silicon oxide is typically compressive. However, in the present embodiment, the thickness of the second protection sub-film 242, t2, is not smaller than the total thickness of the first, third and fourth protection sub-films 241, 243 and 441, t1+t3+t4. Thus, the film stress of the protection film 44 taken as a whole is adjusted to be rather tensile.

Again, more preferably, the second protection sub-film 242 has tensile film stress, and the protection film 44 taken as a whole has tensile film stress. As such, as shown in FIG. 21, the X electrode 11 and protection film 44 have the same type of film stress, further improving adhesiveness.

Again, from a production viewpoint, the thinner the protection film 44, the better it is. Preferably, the thickness t1 of the first protection sub-film 241, the thickness t3 of the third protection sub-film 243, and the thickness t4 of the fourth protection sub-film 441 are no greater than 100 nm each.

[Fifth Embodiment]

Figure 22:
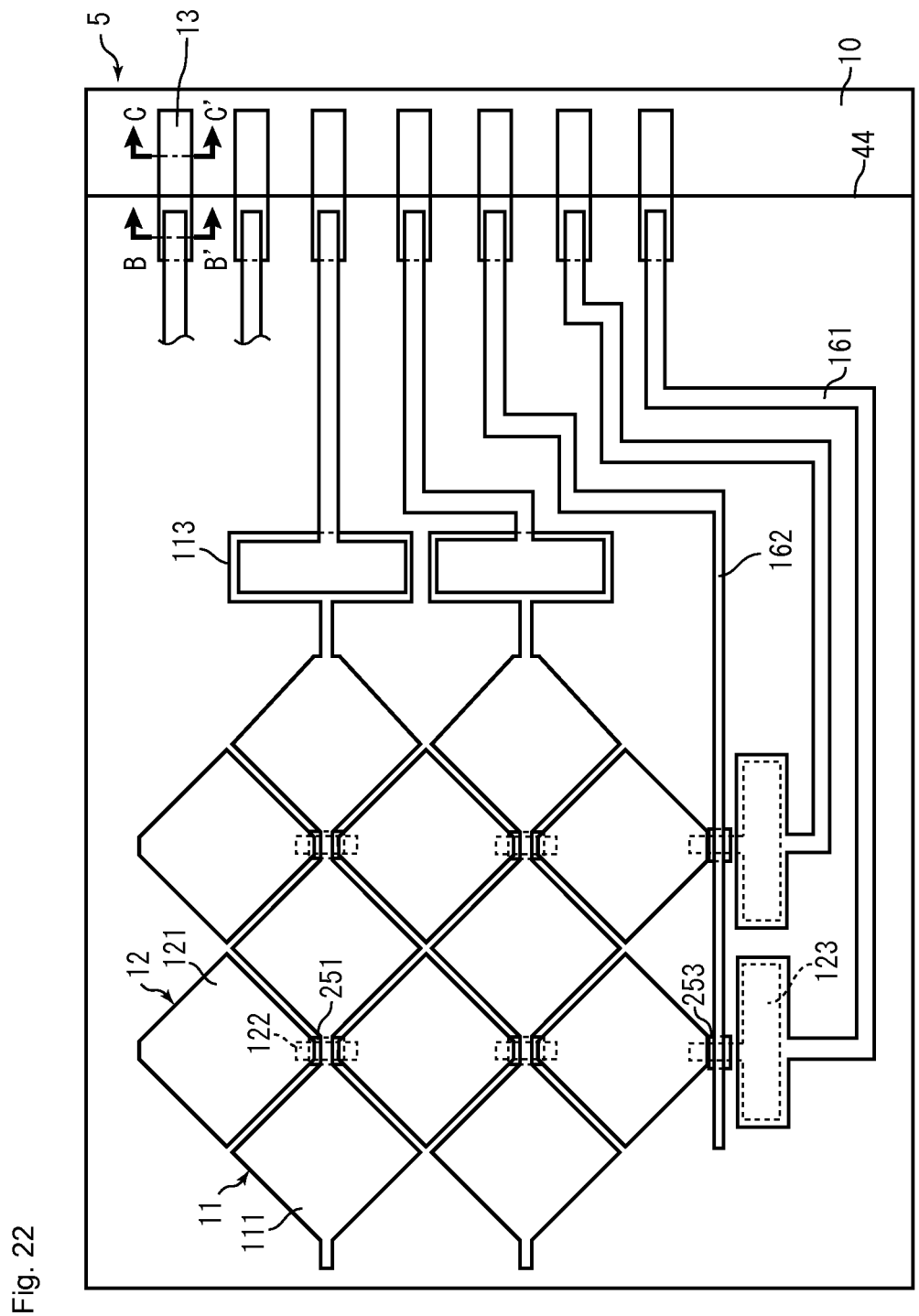
FIG. 22 is a schematic plan view of a touch panel according to a fifth embodiment of the present invention.
Figure 23:
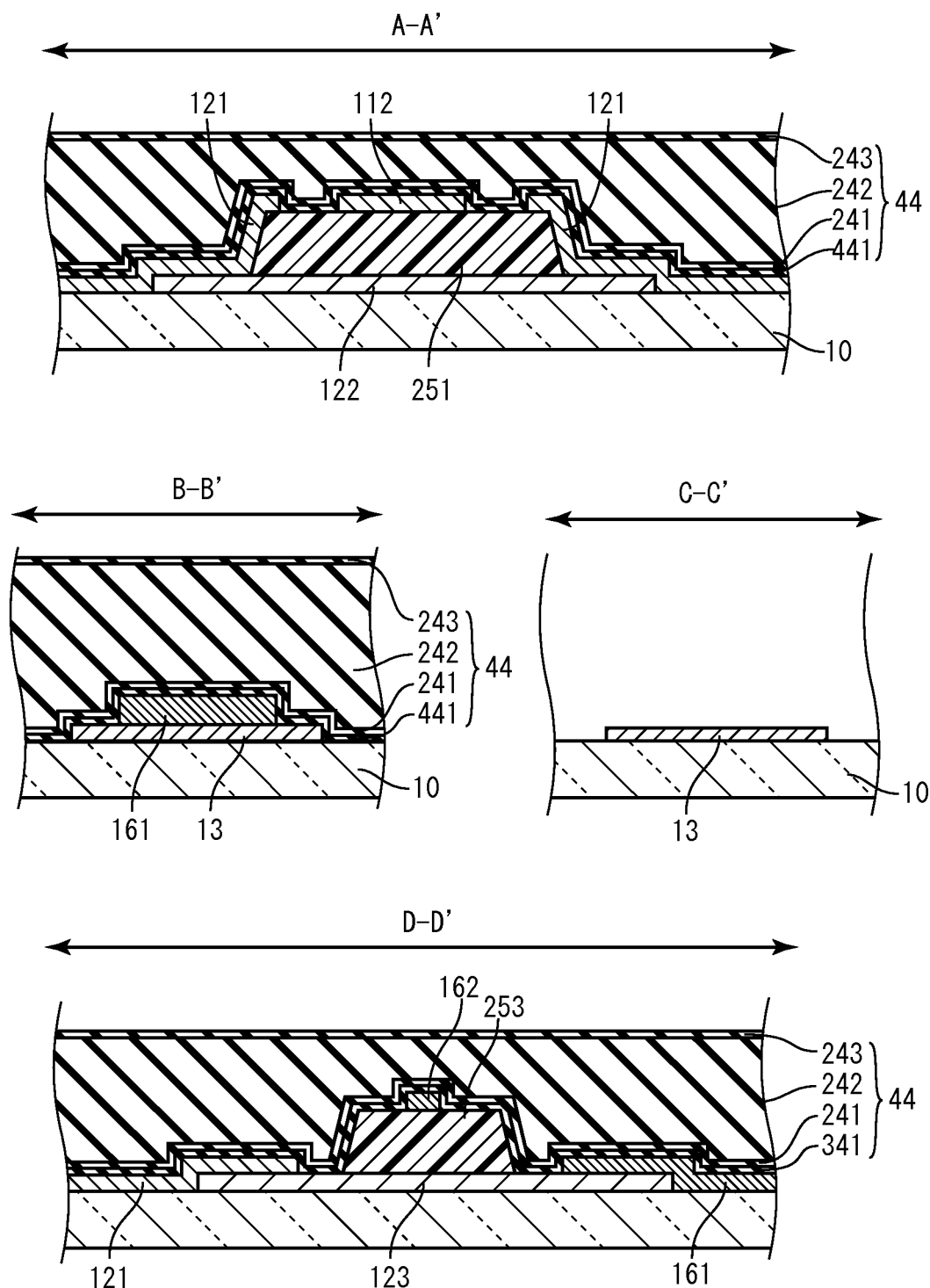
FIG. 23 shows cross-sections taken along lines A-A', B-B', C-C' and D-D' of FIG. 22.

FIG. 22 is a schematic plan view of a touch panel 5 according to a fifth embodiment of the present invention. FIG. 23 shows cross-sections taken along lines A-A', B-B', C-C' and D-D' of FIG. 22.

The touch panel 5 is different from the touch panel 4 in terms of the order in which the components are formed. As such, the films are deposited in a different order.

[Method of Manufacturing Touch Panel 5]

A method of manufacturing the touch panel 5 will be briefly described below with reference to FIGS. 24A to 24E. FIGS. 24A to 24E show cross-sections taken along lines A-A', B-B' and C-C' of FIG. 22.

Figure 24A:
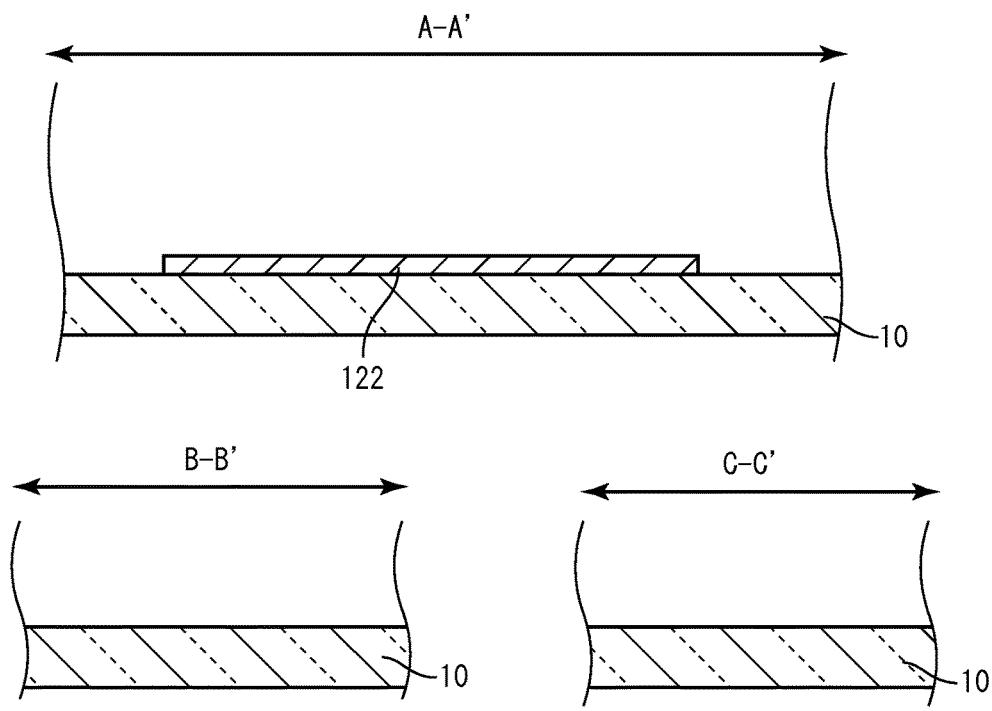
FIG. 24A shows cross-sections illustrating a method of manufacturing the touch panel according to the fifth embodiment of the present invention.

First, as shown in FIG. 24A, connecting portions 122 for Y electrodes 12 are formed. Although not shown in FIG. 17A, connecting portions 123 for the Y electrodes 12 are also formed in this step.

Figure 24B:
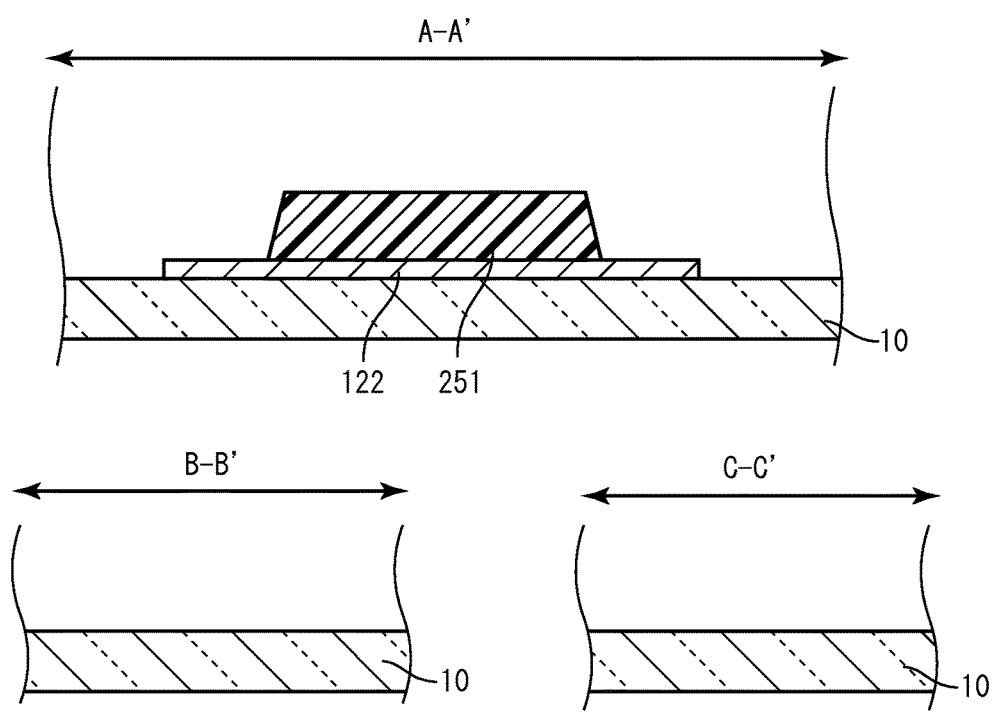
FIG. 24B shows cross-sections illustrating the method of manufacturing the touch panel according to the fifth embodiment of the present invention.

Next, as shown in FIG. 24B, insulating films 251 are formed. Although not shown in FIG. 24B, insulating films 253 are also formed in this step.

Figure 24C:
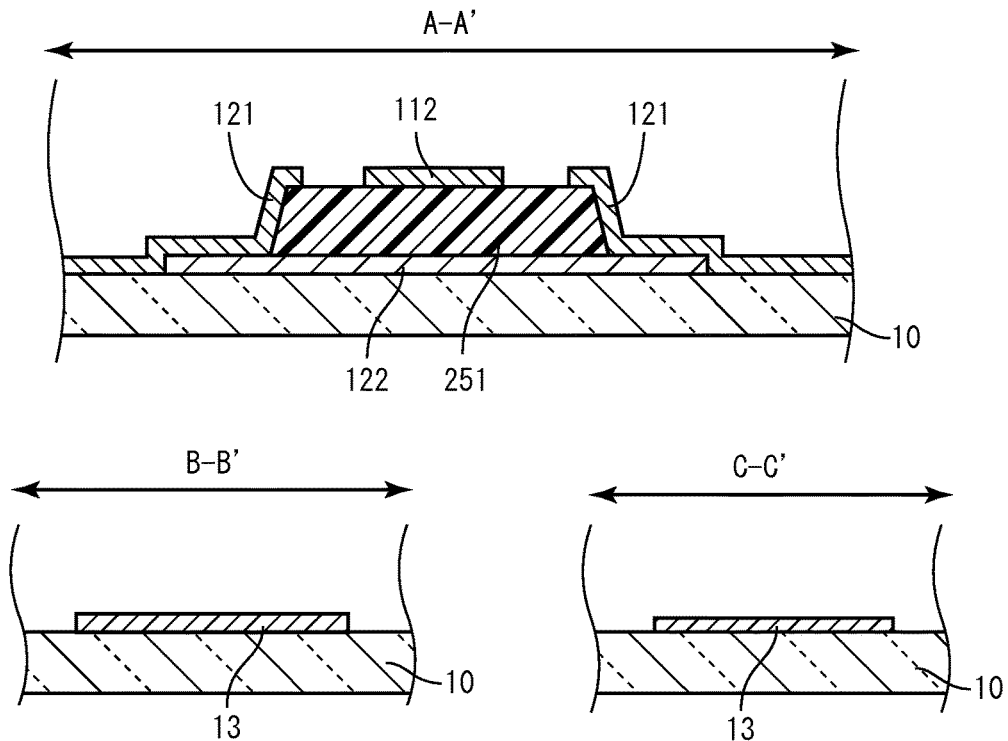
FIG. 24C shows cross-sections illustrating the method of manufacturing the touch panel according to the fifth embodiment of the present invention.

Next, as shown in FIG. 24C, connecting portions 112 for X electrodes 11, insular electrodes 121 for the Y electrodes 12, and terminals 13 are formed. Although not shown in FIG. 24C, insular electrodes 111 and connecting portions 113 for the X electrodes 11 are also formed in this step.

Figure 24D:
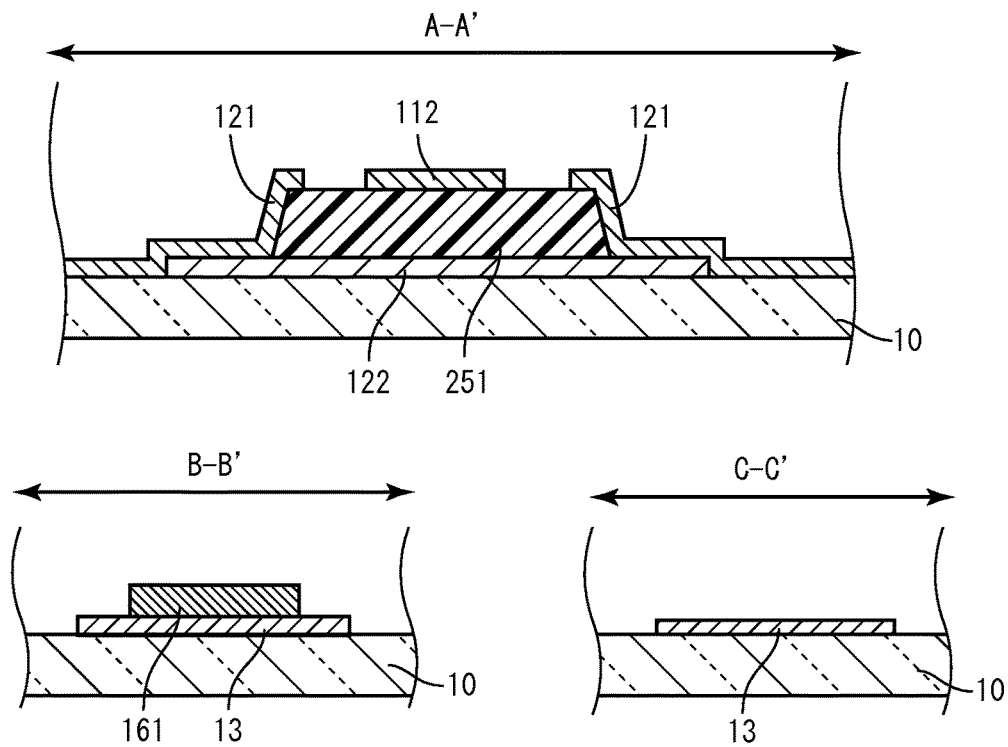
FIG. 24D shows cross-sections illustrating the method of manufacturing the touch panel according to the fifth embodiment of the present invention.

Next, as shown in FIG. 24D, lines 161 are formed. Although not shown in FIG. 17D, a ground line 162 is also formed in this step.

Figure 24E:
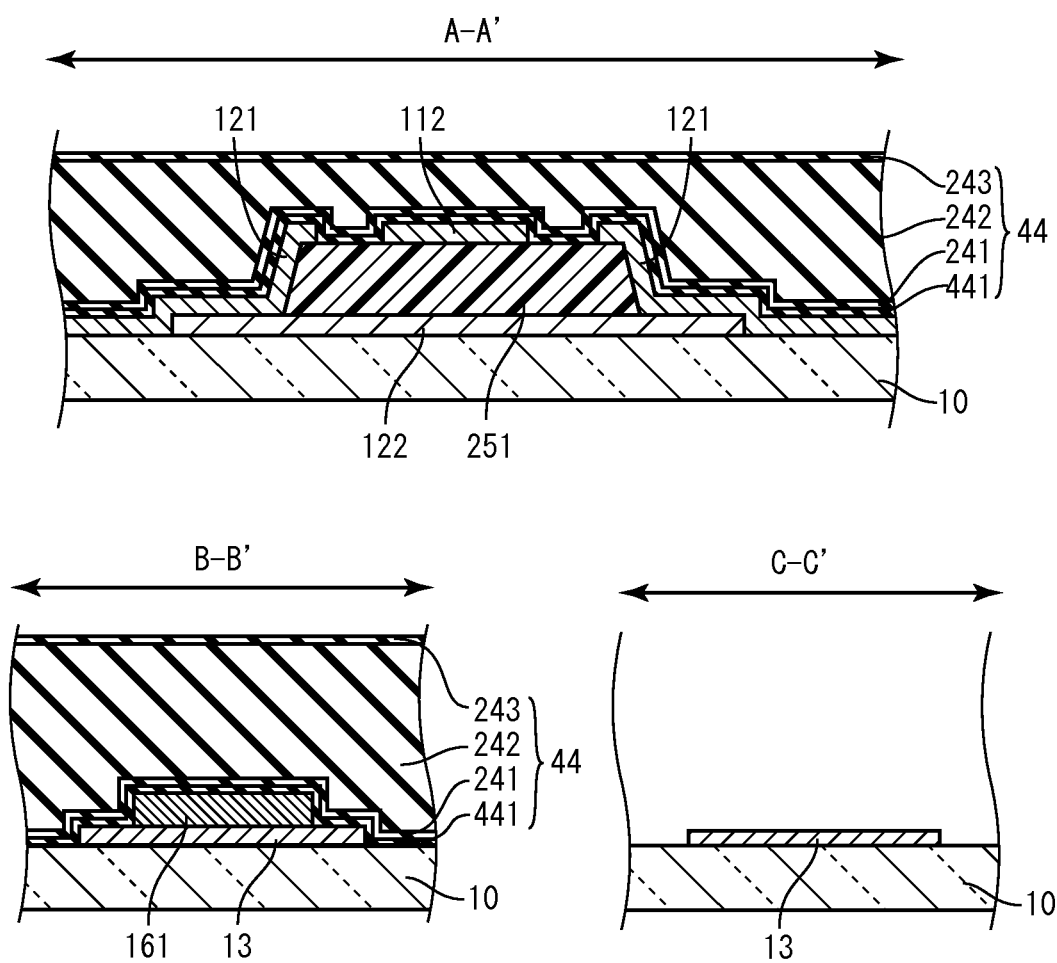
FIG. 24E shows cross-sections illustrating the method of manufacturing the touch panel according to the fifth embodiment of the present invention.

Lastly, as shown in FIG. 24E, a protection film 44 is formed generally over the entire surface of the substrate 10. Again, an overcoat film of an organic material may further be formed over the protection film 44.

A construction of the touch panel 5 according to the fifth embodiment of the present invention and a method of manufacturing the panel have been described. The present embodiment also provides the same advantages as the touch panel 4.

[Other Embodiments]

Although embodiments of the present invention have been described, the present invention is not limited to the above embodiments, and various modifications or combinations are possible within the scope of the invention.

For example, in the arrangement of the touch panel 1, the protection film 14 may include a fourth protection sub-film 41, as in the protection film 44. Similarly, in the arrangement of the touch panel 2 or 3, the protection film 24 may include a fourth protection sub-film 41, as in the protection film 44. Further, in the arrangement of the touch panel 4 or 5, the protection film 44 may be replaced by the protection film 24.

INDUSTRIAL APPLICABILITY

The present invention is industrially useful in a touch panel or a touch panel-equipped display device.

The invention claimed is:
1. A touch panel comprising:
a substrate;
a sensor electrode located on the substrate and formed of an oxide conductive film;
a line electrically connected with the sensor electrode; and
a protection film provided over the line,
the protection film including:
a first protection sub-film formed of silicon nitride;
a second protection sub-film located on the first protection sub-film, formed of silicon nitride and having a lower refractive index than the first protection sub-film; and
a third protection sub-film located on the second protection sub-film, formed of silicon nitride and have a higher refractive index than the second protection sub-film, wherein
the second protection sub-film has a thickness that is no smaller than the total thickness of the first and third protection sub-films, the film stress in the second protection sub-film is tensile, and the film stress in the protection film taken as a whole is tensile.

2. The touch panel according to claim 1, wherein the protection film is in contact with the sensor electrode.

3. The touch panel according to claim 1, wherein:
the refractive index of the first protection sub-film is no lower than 1.805,
the refractive index of the second protection sub-film is lower than 1.805, and
the refractive index of the third protection sub-film is no lower than 1.805.

4. The touch panel according to claim 1, wherein:
the thickness of the first protection sub-film is no greater than 100 nm, and
the thickness of the third protection sub-film is no greater than 100 nm.

5. A touch panel comprising:
a substrate;
a sensor electrode located on the substrate and formed of an oxide conductive film;
a line electrically connected with the sensor electrode; and
a protection film provided over the line,
the protection film including:
a first protection sub-film formed of silicon nitride;
a second protection sub-film located on the first protection sub-film, formed of silicon nitride and having a lower refractive index than the first protection sub-film; and
a third protection sub-film located on the second protection sub-film, formed of silicon nitride and have a higher refractive index than the second protection sub-film, wherein
the second protection sub-film has a thickness that is no smaller than the total thickness of the first and third protection sub-films,
the protection film further includes a fourth protection sub-film formed of silicon oxide,
the first protection sub-film is located on the fourth protection sub-film, and
the thickness of the second protection sub-film is no smaller than the total thickness of the first, third and fourth protection sub-films.

6. A touch panel comprising:
a substrate;
a sensor electrode located on the substrate and formed of an oxide conductive film;
a line electrically connected with the sensor electrode; and
a protection film provided over the line,
the protection film including:
a first protection sub-film formed of silicon nitride;
a second protection sub-film located on the first protection sub-film, formed of silicon nitride and having a lower refractive index than the first protection sub-film; and
a third protection sub-film located on the second protection sub-film, formed of silicon nitride and have a higher refractive index than the second protection sub-film, wherein
the second protection sub-film has a thickness that is no smaller than the total thickness of the first and third protection sub-films,
the sensor electrode includes a first electrode extending in one direction, and a second electrode extending in a direction that crosses the direction in which the first electrode extends,
the second electrode includes:
a plurality of insular electrodes; and
connecting portions connecting the insular electrodes, and
the protection film is located in a layer between the first electrode and the connecting portions.

7. The touch panel according to claim 1, wherein the protection film is located in a layer that is more distant from the substrate than the sensor electrode is.

8. A touch panel-equipped display device comprising:
a liquid crystal display device; and
the touch panel according to claim 1.

* * * * *